(12) United States Patent
Tanaka et al.

(10) Patent No.: US 12,392,428 B2
(45) Date of Patent: Aug. 19, 2025

(54) PIPE JOINT AND PIPE JOINING METHOD

(71) Applicant: KUBOTA CORPORATION, Osaka (JP)

(72) Inventors: Ryunosuke Tanaka, Amagasaki (JP); Yuito Komaru, Amagasaki (JP); Keita Oda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/721,772

(22) PCT Filed: Dec. 8, 2022

(86) PCT No.: PCT/JP2022/045316
§ 371 (c)(1),
(2) Date: Jun. 20, 2024

(87) PCT Pub. No.: WO2023/120214
PCT Pub. Date: Jun. 29, 2023

(65) Prior Publication Data
US 2025/0084937 A1 Mar. 13, 2025

(30) Foreign Application Priority Data

Dec. 20, 2021 (JP) .................................. 2021-205636
Dec. 24, 2021 (JP) .................................. 2021-210080

(51) Int. Cl.
*F16L 21/08* (2006.01)
*F16L 21/03* (2006.01)

(52) U.S. Cl.
CPC ............... *F16L 21/08* (2013.01); *F16L 21/03* (2013.01)

(58) Field of Classification Search
CPC ......... F16L 21/08; F16L 21/007; F16L 21/02; F16L 27/08; F16L 27/0804; F16L 27/12; F16L 47/06; F16L 47/12; F16L 47/18
See application file for complete search history.

(56) References Cited

U.S. PATENT DOCUMENTS 4,194,769 A     3/1980   Bram
4,296,953 A * 10/1981   Nagao ................. F16L 27/1275
                                                                     285/302

(Continued)

FOREIGN PATENT DOCUMENTS

JP       S4027831 Y1     9/1965
JP       H11094153 A     4/1999

(Continued)

OTHER PUBLICATIONS

International Search Report from corresponding International Patent Application No. PCT/JP2022/045316, dated Jan. 17, 2023.

(Continued)

*Primary Examiner* — Aaron M Dunwoody
(74) *Attorney, Agent, or Firm* — Renner, Otto, Boisselle & Sklar, LLP

(57) ABSTRACT

In a pipe joint, a spigot of a first pipe is inserted into a socket of a second pipe, a lock-ring storage groove is formed in the socket, a lock ring is stored in the lock-ring storage groove, a spigot protrusion is formed on an outer circumference of the spigot, and the spigot protrusion is engaged with the lock ring from a deeper portion of the socket in a separation direction of the spigot so as to prevent the spigot from separating from the socket. The lock ring has a first surface for preventing separation facing an opening end of the socket and a second surface for preventing separation facing the deeper portion of the socket.

11 Claims, 20 Drawing Sheets

(56) References Cited

U.S. PATENT DOCUMENTS

| | | | |
|---|---|---|---|
| 4,428,604 A | | 1/1984 | Conner |
| 4,643,466 A | * | 2/1987 | Conner ............... F16L 37/0927 |
| | | | 285/321 |
| 7,243,954 B2 | * | 7/2007 | Toshima ............... F16L 37/088 |
| | | | 285/321 |
| 9,982,817 B2 | * | 5/2018 | Ochi ....................... F16L 21/03 |
| 2006/0108797 A1 | * | 5/2006 | Toshima ............... F16L 37/088 |
| | | | 285/223 |
| 2016/0334035 A1 | * | 11/2016 | Ochi .................. F16L 23/0286 |

FOREIGN PATENT DOCUMENTS

| | | |
|---|---|---|
| JP | 2005140138 A | 6/2005 |
| JP | 2006057728 A | 3/2006 |
| JP | 2015140808 A | 8/2015 |

OTHER PUBLICATIONS

Extended European Search Report issued in corresponding European Patent Application No. 22910925.1 dated Feb. 19, 2025.

* cited by examiner

F I G. 3
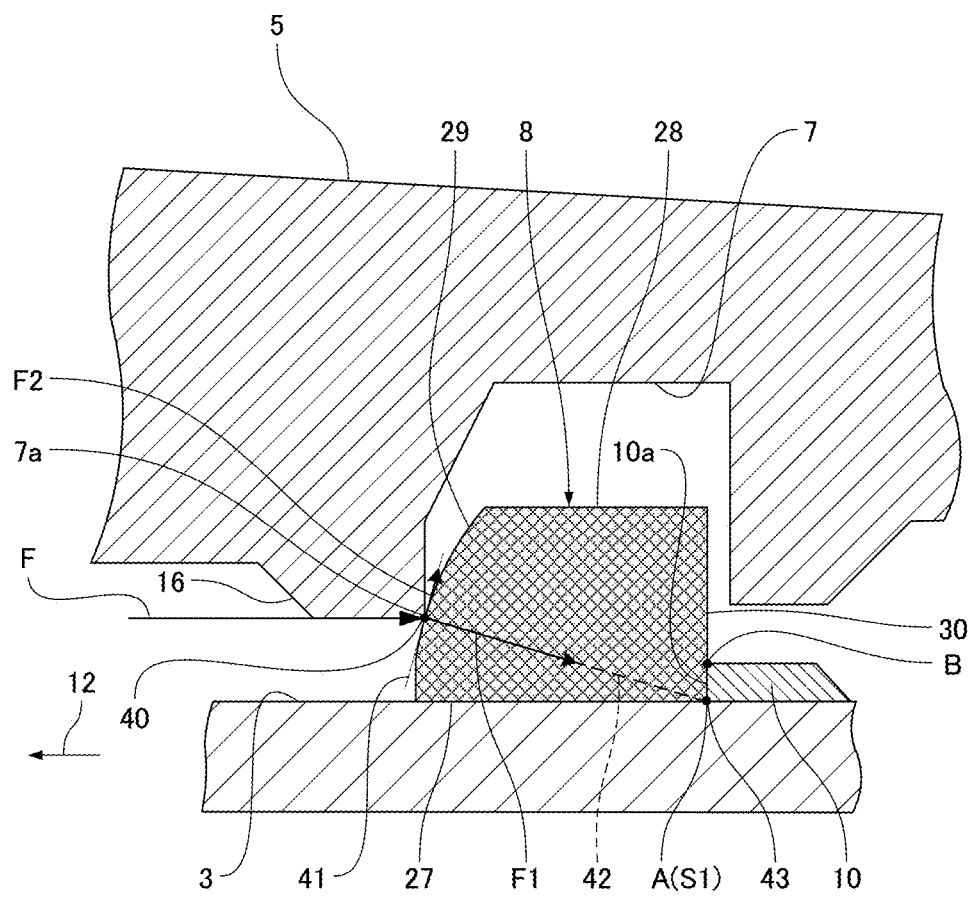

F I G. 2 5
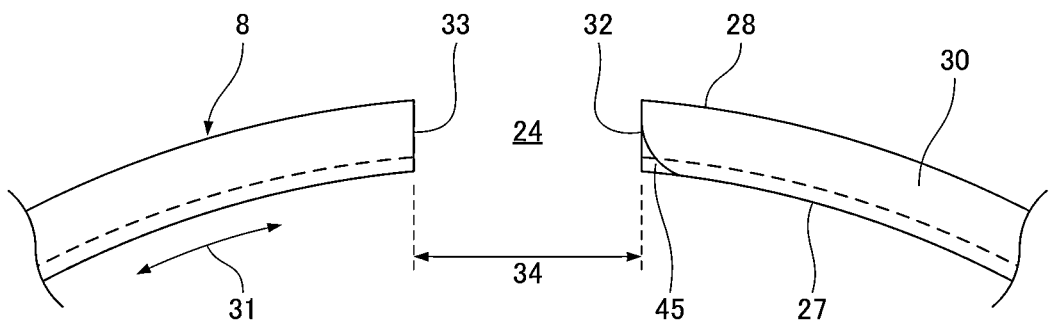

PIPE JOINT AND PIPE JOINING METHOD

FIELD OF THE INVENTION

The present invention relates to a pipe joint having a separation preventive function and a pipe joining method.

BACKGROUND OF THE INVENTION

A pipe joint is described in Japanese Patent Laid-Open No. 2005-140138. As illustrated in FIG. 26, the pipe joint has a first pipe 201 with a spigot 202 inserted into a socket 204 of a second pipe 203. A lock-ring storage groove 205 is formed on the inner circumference face of the socket 204. In the lock-ring storage groove 205, a lock ring 206 is stored as a single-split ring in the circumferential direction. A spigot protrusion 207 is formed on the outer circumference face of the spigot 202. The lock ring 206 has a tapered face 209 facing the opening end of the socket 204 and a backside 212 facing the deeper portion of the socket 204.

When a large tensile force is applied to the pipes 201 and 203 due to earthquakes or the like, the spigot 202 and the socket 204 are likely to separate from each other in the pipe axial direction and the spigot protrusion 207 is engaged with the lock ring 206 from the deeper portion of the socket 204 in a separation direction 211 of the spigot 202 as illustrated.

At this point, a drawing force, a force that separates the spigot 202 and the socket 204 in the pipe axial direction, is applied to the lock ring 206. This force brings the tapered face 209 of the lock ring 206 into contact with an opening edge 208 of the lock-ring storage groove 205 and brings the spigot protrusion 207 into contact with the backside 212 of the lock ring 206 in the pipe axial direction. These contacts prevent separation of the spigot 202 from the socket 204.

At a position where the opening edge 208 of the lock-ring storage groove 205 and the tapered face 209 of the lock ring 206 come into contact with each other, a force applied to the pipes 201 and 203 with the contact portion serving as an application position acts as a force F that presses the tapered face 209 in the pipe axial direction. The force F is divided into a component force F1 in a direction perpendicular to a tangential plane at the contact point on the tapered face 209 and a component force F2 in a direction parallel to the tangential plane. A line of application 210 of the component force F1 in the direction perpendicular to the tangential plane extends in a direction of the surface normal of the tangential plane. The gradient of the tapered face 209 is set such that the surface normal passes through the inner circumference face of the lock ring 206 and extends to the spigot 202.

In the configuration illustrated in FIG. 26, on the backside 212 of the lock ring 206 in contact with the spigot protrusion 207, a moment M in a counterclockwise direction in FIG. 26 is applied to the lock ring 206 by the component force F1 with respect to a center A at an inner edge of the lock ring 206. The moment M presses the lock ring 206 to the outer circumference of the spigot 202. This prevents the lock ring 206 from being separated from the outer circumference of the spigot 202.

However, when a large force exceeding an assumed value of the design is applied to the pipes 201 and 203 in the event of a large-scale earthquake, the moment M increases and the lock ring 206 is pressed to the outer circumference of the spigot 202 by an excessive force. Thus, the strength of the spigot 202 needs to be increased to prevent damage to the spigot 202. In order to increase the strength of the spigot 202, the spigot 202 needs to have a larger thickness.

When the lock ring 206 is set in a normal orientation in the lock-ring storage groove 205, as illustrated in FIG. 26, the tapered face 209 faces the opening end of the socket 204 and the backside 212 faces the deeper portion of the socket 204 on the lock ring 206.

However, the lock ring 206 in an inverted orientation may be set in the lock-ring storage groove 205 by mistake. In this case, the tapered face 209 of the lock ring 206 faces the deeper portion of the socket 204 and the backside 212 faces the opening end of the socket 204.

When the lock ring 206 in an inverted orientation is set in the lock-ring storage groove 205 by mistake, an operator cannot find the inverted orientation of the lock ring 206 until a pipe inserting operation is performed to insert the spigot 202 into the socket 204. Thus, a rejoining operation of the pipes 201 and 203 requires extra time.

An object of the present invention is to provide a pipe joint and a pipe joining method, which can suppress a force pressing a lock ring to the outer circumference of a spigot.

SUMMARY OF THE INVENTION

A pipe joint according to the present invention is presented, in which a spigot of a first pipe is inserted into a socket of a second pipe, a lock-ring storage groove is formed on an inner circumference of the socket, a lock ring stored in the lock-ring storage groove is attached to an outer circumference of the spigot, a spigot protrusion is formed on the outer circumference of the spigot, and the spigot protrusion is engaged with the lock ring from a deeper portion of the socket in a separation direction of the spigot so as to prevent the spigot from separating from the socket. The lock ring has a first surface for preventing separation facing an opening end of the socket and a second surface for preventing separation facing the deeper portion of the socket. In a state in which the spigot protrusion is engaged with the lock ring and the first surface for preventing separation of the lock ring is in contact with an opening edge of the lock-ring storage groove around a pipe axial direction, a surface normal of a tangential plane at a contact point between the opening edge of the lock-ring storage groove and the first surface for preventing separation of the lock ring passes through the second surface for preventing separation of the lock ring.

When a drawing force is applied to the pipes in the pipe joint, the spigot protrusion is engaged with the lock ring and the first surface for preventing separation of the lock ring is brought into contact with the opening edge of the lock-ring storage groove. At this point, a force in the pipe axial direction is applied to the contact point between the first surface for preventing separation of the lock ring and the opening edge of the lock-ring storage groove. The force applied to the contact point in the pipe axial direction is applied to the lock ring as a component force along the surface normal of the tangential plane at the contact point and a component force along the tangential plane.

The surface normal of the tangential plane passes through the second surface for preventing separation, so that a line of application of the component force along the surface normal of the tangential plane passes through the second retaining surface.

The component force applied along the surface normal of the tangential plane has a component of force applied in the axial direction of the lock ring and a component of force applied in a radial direction of the lock ring. The component in the axial direction of the lock ring increases and the component in the radial direction of the lock ring decreases as an angle of the surface normal decreases with respect to the axis of the lock ring. Thus, the surface normal of the tangential plane passes through the second surface for preventing separation of the lock ring, so that the component in the radial direction of the lock ring is small in the component force along the surface normal of the tangent surface as compared with a case where the surface normal of the tangential plane passes through an inner circumference face of the lock ring. This can suppress an applied force that presses the lock ring onto the outer circumference of the spigot based on the drawing force.

According to the pipe joint of the present invention, the inner edge of the lock ring is preferably included in the second surface for preventing separation. The surface normal of the tangential plane preferably passes through the inner edge of the lock ring while passing through the second surface for preventing separation.

According to the pipe joint of the present invention, the inner edge of the lock ring is preferably included in the second surface for preventing separation. The surface normal of the tangential plane preferably passes through the second surface for preventing separation between the inner edge of the lock ring and a position where the outer edge of the spigot protrusion is in contact with the second surface for preventing separation.

According to the pipe joint of the present invention, the first surface for preventing separation of the lock ring is preferably shaped like a circular conical surface.

According to the pipe joint of the present invention, the first surface for preventing separation of the lock ring is preferably curved along an arc having the center on the surface normal of the tangential plane.

According to the pipe joint of the present invention, the center of the arc of the first surface for preventing separation is preferably located at an intersection point of the surface normal of the tangential plane and the second surface for preventing separation.

According to the pipe joint of the present invention, the lock ring is preferably a ring having a single-cut structure with a dividing portion at a point along a circumferential direction. End faces at the dividing portion of the lock ring in the circumferential direction preferably have engaging portions that allow engagement of a spacing keeping tool, the spacing keeping tool keeping a spacing between the end faces of the lock ring increased in diameter. At least one of the end faces of the lock ring preferably has a release portion for releasing the spacing keeping tool in a separation direction that separates the spacing keeping tool inward from the end face of the lock ring in the radial direction of the lock ring. If the lock ring is stored in a normal orientation in the lock ring storage groove, the engaging portion is preferably placed near the opening end of the socket and the release portion is preferably placed near a deep end of the socket. The engaging portions and the release portion are preferably exposed inward from the lock-ring storage groove in the radial direction in a state in which the lock ring is increased in diameter.

With this configuration, when the first pipe and the second pipe are joined, the lock ring is first set in the lock-ring storage groove. At this point, if the lock ring is stored in a normal orientation in the lock-ring storage groove in the pipe axial direction, the engaging portion is placed near the opening end of the socket and the release portion is placed near the deep end of the socket.

Thereafter, in a state in which the lock ring is increased in diameter by an expander tool, the spacing keeping tool is inserted from the opening end of the socket into the dividing portion of the lock ring and is engaged with the engaging portions. At this point, the engaging portions are placed closer to the opening end of the socket than the release portion, so that the spacing keeping tool is engaged with the engaging portion. Thus, the spacing keeping tool can keep the spacing between the end faces of the lock ring increased in diameter.

In this state, the spigot is inserted into the socket. At this point, the spigot protrusion passes through the inner circumference of the lock ring from the opening end to the deep end of the socket, and then the spacing keeping tool is removed from the lock ring. The removal reduces the diameter of the lock ring.

When the first pipe and the second pipe are joined, the lock ring in an inverted orientation may be set by mistake in the lock-ring storage groove in the pipe axial direction. At this point, the release portion is placed near the opening end of the socket, and the engaging portion is placed near the deep end of the socket.

In such positioning with the lock ring increased in diameter by the expander tool, the spacing keeping tool is inserted from the opening end of the socket into the dividing portion of the lock ring and is engaged with the engaging portions. At this point, the release portion is placed closer to the opening end of the socket than the engaging portions, so that the spacing keeping tool is guided to the release portion and is separated inward from the end face of the lock ring in the radial direction of the lock ring without being engaged with the engaging portions.

As described above, if the lock ring is set in an inverted orientation by mistake in the lock-ring storage groove, the spacing keeping tool to be engaged with the engaging portions of the lock ring is guided to the release portion and is separated from the end face of the lock ring without being engaged with the engaging portions. Thus, the spacing keeping tool cannot keep the spacing between the end faces of the lock ring increased in diameter.

With this configuration, an operator can find an error in the attachment of the lock ring before a pipe inserting operation is performed to insert the spigot into the socket. This can shorten a time for a rejoining operation of the pipes.

According to the pipe joint of the present invention, the release portion is preferably an inclined face extending from the end face of the lock ring to the inner circumference face of the lock ring, and the inclined face preferably tilts in a direction that increases the spacing between the end faces of the lock ring toward the inside in the radial direction.

In the pipe joint, if the lock ring is set in an inverted orientation by mistake in the lock-ring storage groove, the spacing keeping tool is guided inward in the radial direction of the lock ring by the inclined face of the release portion and is separated from the end face of the lock ring while the lock ring is increased in diameter by using the expander tool.

According to the pipe joint of the present invention, the release portion is preferably a curved surface extending like an arc from the end face of the lock ring to the inner circumference face of the lock ring, and the curved surface is preferably curved in a direction that increases the spacing between the end faces of the lock ring toward the inside in a radial direction.

In the pipe joint, if the lock ring is set in an inverted orientation by mistake in the lock-ring storage groove, the spacing keeping tool is guided inward in the radial direction of the lock ring by the curved surface of the release portion and is separated from the end face of the lock ring while the lock ring is increased in diameter by using the expander tool.

A pipe joining method for assembling the pipe joint of the present invention is presented. The method includes setting the lock ring into the lock-ring storage groove in the socket, inserting the spacing keeping tool from the opening end of the socket into the dividing portion of the lock ring and engaging the spacing keeping tool with the engaging portions of the end faces while the lock ring is increased in diameter by using the expander tool, removing the expander tool from the lock ring and keeping, by using the spacing keeping tool, the spacing between the end faces of the lock ring increased in diameter, and removing the spacing keeping tool from the lock ring and reducing the diameter of the lock ring when the spigot protrusion is caused to pass through the inner circumference of the lock ring from the opening end to the deeper portion of the socket by inserting the spigot into the socket.

According to the joining method, if the lock ring is set in a normal orientation in the lock-ring storage groove in the pipe axial direction, the engaging portion is placed near the opening end of the socket and the release portion is placed near the deep end of the socket. Thus, the spacing keeping tool can be engaged with the engaging portions of the lock ring, so that the spacing keeping tool can keep the spacing between the end faces of the lock ring increased in diameter.

A pipe joining method for assembling the pipe joint of the present invention is presented. The method includes setting the lock ring into the lock-ring storage groove in the socket, determining that the lock ring is attached in an inverted orientation in the pipe axial direction if the spacing keeping tool is guided to the release portion and is separated from the end face of the lock ring without being engaged with the engaging portions when the spacing keeping tool is inserted from the opening end of the socket into the dividing portion of the lock ring and is to be engaged with the engaging portions of the end faces while the lock ring is increased in diameter by using the expander tool, removing the expander tool from the lock ring to reduce the diameter of the lock ring, removing the lock ring from the lock-ring storage groove, correcting the lock ring to a normal orientation and setting the lock ring into the lock-ring storage groove again, inserting the spacing keeping tool from the opening end of the socket into the dividing portion of the lock ring and engaging the spacing keeping tool with the engaging portions of the end faces while the lock ring is increased in diameter by using the expander tool, removing the expander tool from the lock ring and keeping, by using the spacing keeping tool, the spacing between the end faces of the lock ring increased in diameter, and removing the spacing keeping tool from the lock ring and reducing the diameter of the lock ring when the spigot protrusion is caused to pass through the inner circumference of the lock ring from the opening end to the deeper portion of the socket by inserting the spigot into the socket.

According to the joining method, if the lock ring is set in an inverted orientation by mistake in the lock-ring storage groove in the pipe axial direction, the release portion is placed near the opening end of the socket and the engaging portion is placed near the deep end of the socket. Thus, the spacing keeping tool is guided to the release portion and is separated inward from the end face of the lock ring in the radial direction of the lock ring without being engaged with the engaging portions.

The separation does not allow the spacing keeping tool to keep the spacing between the end faces of the lock ring increased in diameter. Therefore, an operator can find an error in the attachment of the lock ring before a pipe inserting operation is performed to insert the spigot into the socket. This can shorten a time for a rejoining operation of the pipes.

According to the present invention, in a state in which the opening edge of the lock-ring storage groove is in contact with the first surface for preventing separation of the lock ring, a force applied from the opening edge at the contact point between the opening edge and the first surface for preventing separation in the pipe axial direction is applied to the lock ring as a component force along the surface normal of the tangential plane and a component force along the tangential plane.

The surface normal of the tangential plane passes through the second surface for preventing separation, so that a line of application of the component force along the surface normal of the tangential plane passes through the second retaining surface.

The component force applied along the surface normal of the tangential plane has a component of force applied in the axial direction of the lock ring and a component of force applied in a radial direction of the lock ring. The component in the axial direction of the lock ring increases and the component in the radial direction of the lock ring decreases as the angle of the surface normal decreases with respect to the axis of the lock ring. Thus, the surface normal of the tangential plane passes through the second surface for preventing separation, so that the component of force in the radial direction of the lock ring is small in the component force along the surface normal of the tangent surface as compared with the case where the surface normal of the tangential plane passes through the inner circumference face of the lock ring. This can suppress an applied force that presses the lock ring onto the outer circumference of the spigot based on a drawing force when the spigot is removed from the socket.

BRIEF DESCRIPTION OF THE DRAWINGS

FIG. 3 illustrates a principal part of the pipe joint.

FIG. 25 is a rear view illustrating a dividing portion of a lock ring provided in a pipe joint according to a sixth embodiment of the present invention.

DETAILED DESCRIPTION OF THE INVENTION

Embodiments of the present invention will be described below in accordance with the accompanying drawings.

First Embodiment

Figure 1:
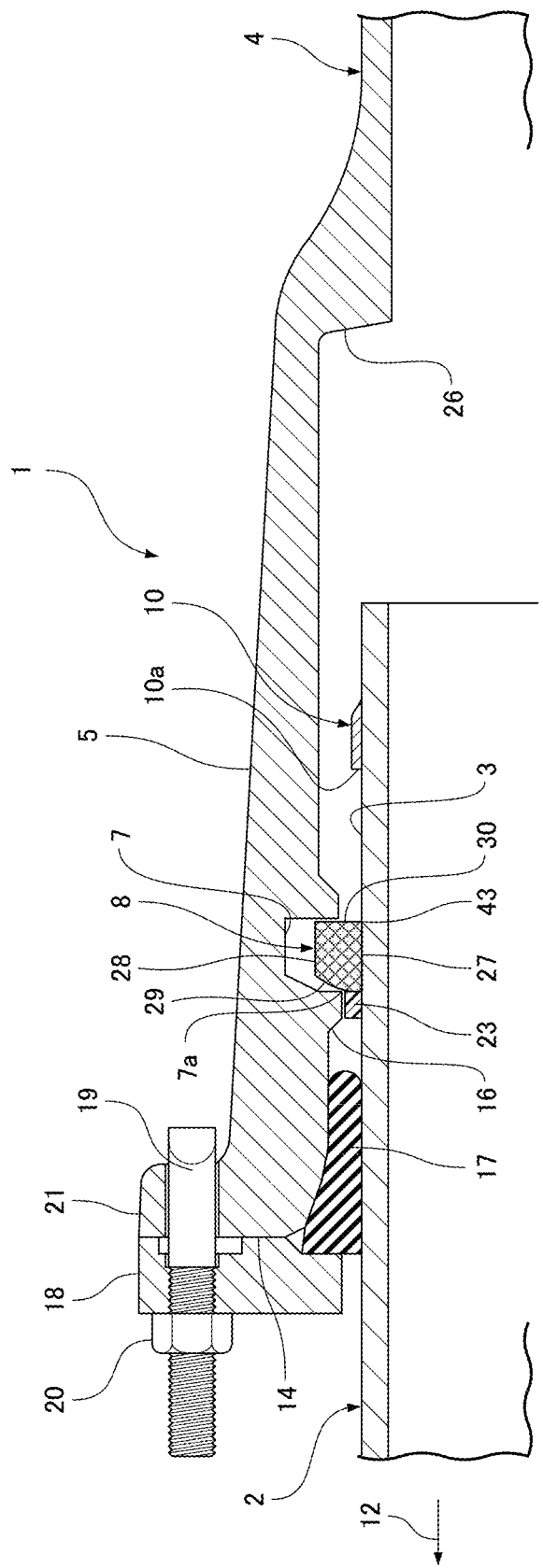
FIG. 1 is a cross-sectional view illustrating a pipe joint along a pipe axial direction according to a first embodiment of the present invention.

In a first embodiment, as illustrated in FIG. 1, a spigot 3 of a first pipe 2 is inserted into a socket 5 of a second pipe 4 in a pipe joint 1, so that the pipes 2 and 4 are joined.

A lock-ring storage groove 7 is circumferentially formed on the inner circumference of the socket 5. A lock ring 8 is stored in the lock-ring storage groove 7. The lock ring 8 is attached to be wrapped around the outer circumference of the spigot 3 while being stored in the lock-ring storage groove 7.

A spigot protrusion 10 is formed around the outer circumference of the distal end portion of the spigot 3.

The pipe joint 1 has a separation preventive function. The separation preventive function engages the spigot protrusion 10 onto the lock ring 8 from the deeper portion of the socket 5 in a separation direction 12 of the spigot 3, thereby preventing separation of the spigot 3 from the socket 5.

A socket protrusion 16 protruding inward from the inner circumference of the socket 5 in a radial direction 15 faces the lock-ring storage groove 7 from a point near the opening end of the socket 5. A deep end face 26 opposed to the distal end face of the spigot 3 along the pipe axial direction is formed in the deeper portion of the socket 5.

A clearance between the outer circumference of the spigot 3 and the inner circumference of the socket 5 is sealed with an annular seal member 17 made of an elastic material such as rubber.

A gland 18 that presses the seal member 17 toward the deeper portion of the socket 5 is in contact with an opening end face 14 of the socket 5. The gland 18 is coupled to a flange 21 at the opening end of the socket 5 with a plurality of T bolts 19 and nuts 20 in the circumferential direction.

A backup ring 23 made of resin is provided between the inner circumference of the socket protrusion 16 and the outer circumference of the spigot 3. The backup ring 23 is a ring having a single-cut structure that is divided at a point in the circumferential direction. The backup ring 23 is adjacent to the lock ring 8.

The spigot 3 passes through the inner circumferences of the gland 18, the seal member 17, the backup ring 23, and the lock ring 8.

Figure 2:
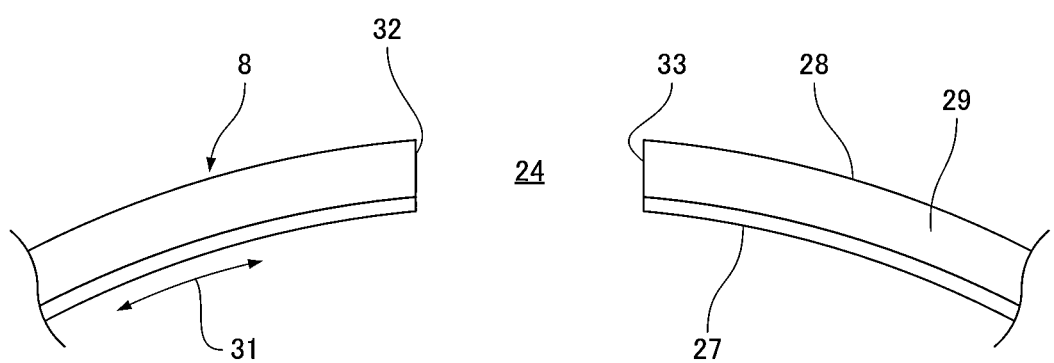
FIG. 2 is a front view illustrating a divided portion of a lock ring provided in the pipe joint.

As illustrated in FIG. 2, the lock ring 8 is a ring having a single-cut structure with a dividing portion 24 at a point in a circumferential direction 31. As illustrated in FIGS. 2 and 3, the lock ring 8 has an inner circumference face 27, an outer circumference face 28, a first surface for preventing separation 29 that faces the opening end of the socket 5 when being set in a normal orientation, a second surface for preventing separation 30 that faces the deeper portion of the socket 5 when being set in a normal orientation, and a pair of end faces 32 and 33 opposed to each other at the dividing portion 24.

As illustrated in FIGS. 1 and 3, the first surface for preventing separation 29 can make contact with one opening edge 7a of the lock-ring storage groove 7 around the pipe axis. The second surface for preventing separation 30 is a flat face extending along a radial direction of the lock ring 8 and faces the spigot protrusion 10 in the pipe axial direction.

The spigot protrusion 10 circumferentially has a face 10a facing the second surface for preventing separation 30 of the lock ring 8. The face 10a of the spigot protrusion 10 is a flat face extending along a radial direction. The face 10a can entirely make contact with the second surface for preventing separation 30 of the lock ring 8 from the innermost position to the outermost position in the radial direction.

Specifically, in a cross section illustrated in FIG. 3, the face 10a of the spigot protrusion 10 is in contact with the second surface for preventing separation 30 between an A point at the innermost position and a B point at the outermost position in the radial direction of the lock ring 8. The A point at the innermost position is the position of an inner edge 43 of the lock ring 8.

The B point at the outermost position is a position where the outer edge of the face 10a of the spigot protrusion 10 is in contact with the second surface for preventing separation 30 of the lock ring 8. The A point at the innermost position of the spigot protrusion 10, that is, a point corresponding to the inner edge 43 of the lock ring 8 and the B point at the outermost position are also included in the second surface for preventing separation 30 of the lock ring 8.

As illustrated in FIG. 3, the spigot protrusion 10 is engaged with the lock ring 8, and the first surface for preventing separation 29 of the lock ring 8 is in contact with the one opening edge 7a of the lock-ring storage groove 7 around the pipe axis. In this contact state, a surface normal 42 of a tangential plane 41 at a contact point 40 between the opening edge 7a of the lock-ring storage groove 7 and the first surface for preventing separation 29 of the lock ring 8 passes through the second surface for preventing separation 30 of the lock ring 8.

In the cross section illustrated in FIG. 3, the first surface for preventing separation 29 has a curved shape along an arc having a center S1 on the surface normal 42 of the tangential plane 41. The center S1 is located at the intersection point of the surface normal 42 of the tangential plane 41 and the second surface for preventing separation 30.

While passing through the second surface for preventing separation 30, the surface normal 42 of the tangential plane 41 passes through the inner edge 43 of the lock ring 8, that is, the A point. The A point is the innermost position of the second surface for preventing separation 30 in the radial direction, that is being placed in contact with the spigot protrusion 10.

With this configuration, when a large drawing force is applied to the pipes 2 and 4 due to an earthquake or the like, the spigot 3 and the socket 12 are likely to separate from each other in the pipe axial direction. Thus, a state illustrated in FIG. 1 changes to a state illustrated in FIG. 3. Hence, the spigot protrusion 10 is engaged with the lock ring 8 from the deeper portion of the socket 5 in the separation direction 12 of the spigot 3.

At this point, a force for separating the spigot 3 and the socket 5 in the pipe axial direction is applied to the lock ring 8. This force brings the first surface for preventing separation 29 of the lock ring 8 into contact with the opening edge 7a of the lock-ring storage groove 7 in the pipe axial direction and brings the spigot protrusion 10 into contact with the second surface for preventing separation 30 of the lock ring 8. Thus, the spigot 3 can be prevented from separating from the socket 12.

At the contact point 40 between the opening edge 7a of the lock-ring storage groove 7 and the first surface for preventing separation 29 of the lock ring 8, a force F that presses the first surface for preventing separation 29 in the pipe axial direction is applied by the drawing force applied between the pipes 2 and 4 while the contact point 40 serves as a point of application. The force F is applied to the lock ring 8 as a component force F1 perpendicular to the tangential plane 41 at the contact point 40 of the first surface for preventing separation 29 and a component force F2 parallel to the tangential plane 41. A line of application of the component force F1 perpendicular to the tangential plane 41 extends in the direction of the surface normal 42 of the tangential plane 41.

In the cross section illustrated in FIG. 3, the surface normal 42 of the tangential plane 41 passes through the A point at the innermost position in the radial direction of the second surface for preventing separation 30. Thus, around the A point at the innermost position, a moment generated by the component force F1 along the surface normal 42 is not applied to the lock ring 8.

The first surface for preventing separation 29 is curved along the arc having the center S1 on the surface normal 42 of the tangential plane 41. The center S1 of the arc of the first surface for preventing separation 29 is present at the intersection point of the surface normal 42 of the tangential plane 41 and the second surface for preventing separation 30. Thus, even if the position of the contact point 40 between the one opening edge 7a of the lock-ring storage groove 7 and the first surface for preventing separation 29 of the lock ring 8 is displaced by an assembling error or the like, the surface normal 42 of the tangential plane 41 passes through the center S1 of the arc, the center S1 being located on the second surface for preventing separation 30.

The center S1 of the arc of the first surface for preventing separation 29 is located at the intersection point of the surface normal 42 of the tangential plane 41 and the second surface for preventing separation 30, thereby securely setting the position of the passage of the surface normal 42 of the tangential plane 41 through the second surface for preventing separation 30.

Figure 4:
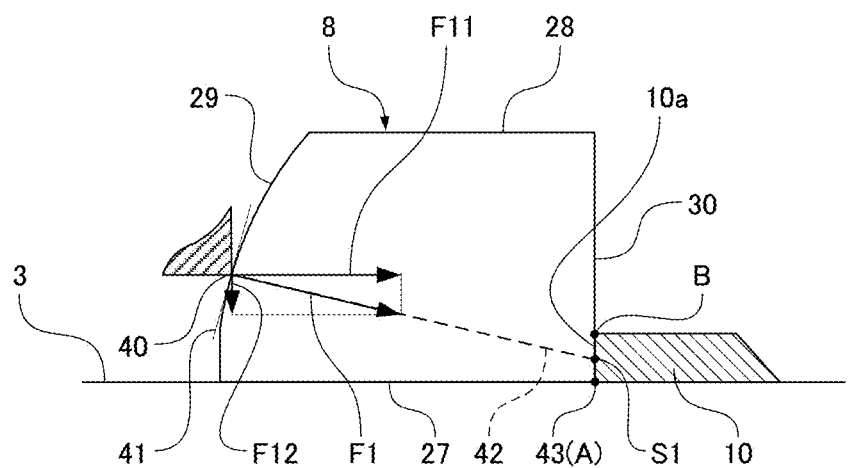
FIG. 4 illustrates the principal part of the pipe joint and a relationship between a component force F1 along a surface normal direction of a tangential plane on the lock ring and a component F11 oriented in the pipe axial direction of the component force F1 and a component F12 oriented in a pipe radial direction.

As illustrated in FIG. 4, the component force F1 applied along the surface normal 42 of the tangential plane 41 has a component F11 of force applied along the axis of the lock ring 8 and a component F12 of force applied in a radial direction of the lock ring 8. The component F11 along the axis of the lock ring 8 increases and the component F12 in the radial direction of the lock ring 8 decreases as the angle of the surface normal 42 decreases with respect to the axis of the lock ring 8.

Figure 26:
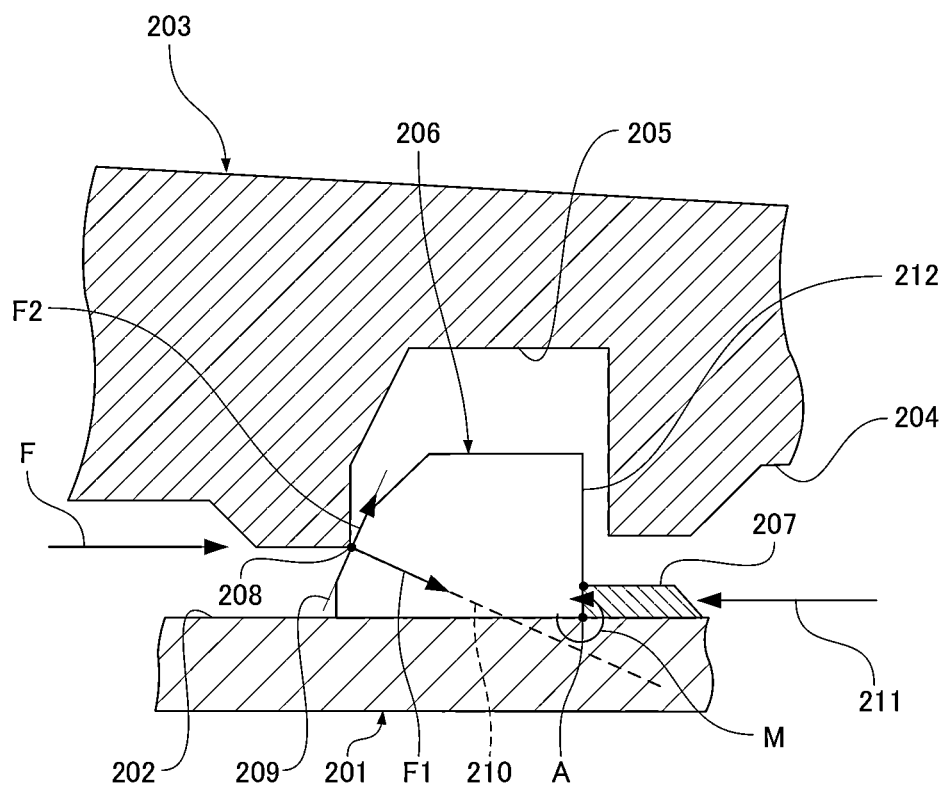
FIG. 26 illustrates a principal part of a conventional pipe joint.

As illustrated in FIG. 3, if the surface normal 42 passes through the A point at the innermost position of the second surface for preventing separation 30 of the lock ring 8, the angle of the surface normal 42 with respect to the axis of the lock ring 8 is smaller than that in the case where the surface normal passes through the inner circumference face of the lock ring 206 as illustrated in FIG. 26. Thus, as illustrated in FIG. 4, the component F12 of the component force F1 applied along the surface normal 42 decreases, the component F12 being applied in the radial direction of the lock ring 8. This can suppress a pressing force that presses the lock ring 8 to the spigot 3 based on a force from the contact point 40.

Second Embodiment

Figure 5:
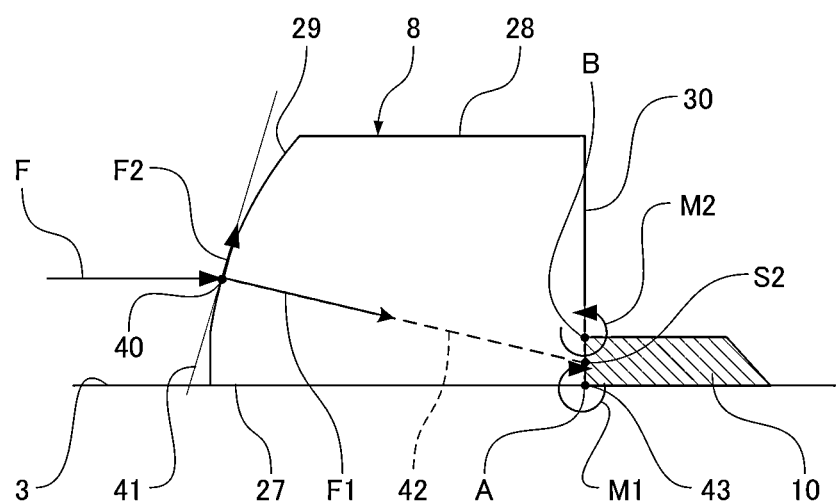
FIG. 5 is a schematic diagram showing a relationship between a tangential plane and a surface normal and a center position of an arc in a principal part of a pipe joint according to a second embodiment of the present invention.

In a second embodiment, as illustrated in FIG. 5, an opening edge 7a (see FIG. 3) of a lock-ring storage groove 7 and a first surface for preventing separation 29 of a lock ring 8 are in contact with each other at a contact point 40. When a center S2 of an arc of the first surface for preventing separation 29 is displaced on a second surface for preventing separation 30 in a radial direction of the lock ring 8, the cross-sectional shape of the first surface for preventing separation 29 changes according to a change of a distance between the contact point 40 and the center S2 of the arc.

Furthermore, a position where a surface normal 42 of a tangential plane 41 at the contact point 40 passes through the second surface for preventing separation 30 also moves in a radial direction of the lock ring 8 according to a movement of the center S2 of the arc.

If the surface normal 42 of the tangential plane 41 at the contact point 40 passes through the second surface for preventing separation 30 between an A point at the innermost position and a B point at the outermost position, a moment M1 in a clockwise direction in FIG. 5 is applied to the lock ring 8 by a component force F1 applied along the surface normal 42, with respect to the A point at the innermost position where the spigot protrusion 10 is in contact with the second surface for preventing separation 30 of the lock ring 8.

At this point, the surface normal 42 passes through the second surface for preventing separation 30 of the lock ring 8, so that the angle of the surface normal 42 with respect to the axis of the lock ring 8 is smaller than that in the case where the surface normal passes through the inner circumference face of the lock ring 206 as illustrated in FIG. 26. Thus, a component F12 (see FIG. 4) in a radial direction of the lock ring 8 decreases in the component force F1 along the surface normal 42. This can suppress a pressing force that presses the lock ring 8 to the outer circumference of a spigot 3 based on a force from the contact point 40.

The lock ring 8 has stiffness against a twist. If a force exceeding the stiffness is applied to the lock ring 8, the center of a moment applied to the lock ring 8 moves from the A point at the innermost position to the B point at the outermost position in the radial direction of the spigot protrusion 10.

Thus, a moment M2 in a counterclockwise direction in FIG. 5 is applied to the lock ring 8 centered on the B point at the outermost position, the moment M2 being generated by the component force F1 applied along the surface normal 42. The lock ring 8 is pressed to the outer circumference of the spigot 3 by the moment M2. Thus, the lock ring 8 can be prevented from separating from the outer circumference of the spigot 3.

Third Embodiment

Figure 6:
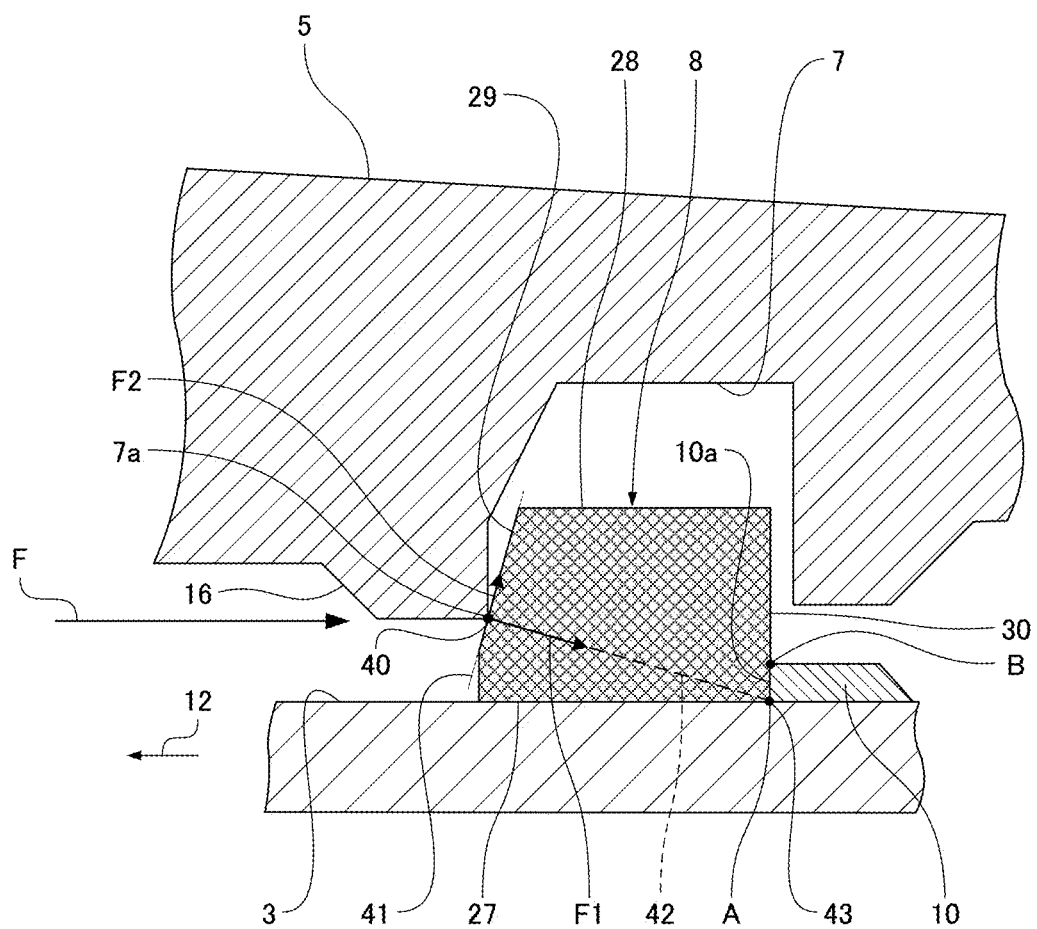
FIG. 6 illustrates a principal part of a pipe joint according to a third embodiment of the present invention.

In a third embodiment, as illustrated in FIG. 6, a first surface for preventing separation 29 of a lock ring 8 is formed as a tapered face.

In this case, the gradient of the taper of the first surface for preventing separation 29 is adjusted, so that a configuration can be obtained such that a surface normal 42 of a tangential plane 41 at a contact point 40 passes through an A point at the innermost position. Furthermore, the gradient of the tapered face of the first surface for preventing separation 29 is regulated, so that a configuration also can be obtained such that the surface normal 42 of the tangential plane 41 at the contact point 40 passes through a second surface for preventing separation 30 at a position between the A point at the innermost position and a B point at the outermost position.

Fourth Embodiment

Figure 7:
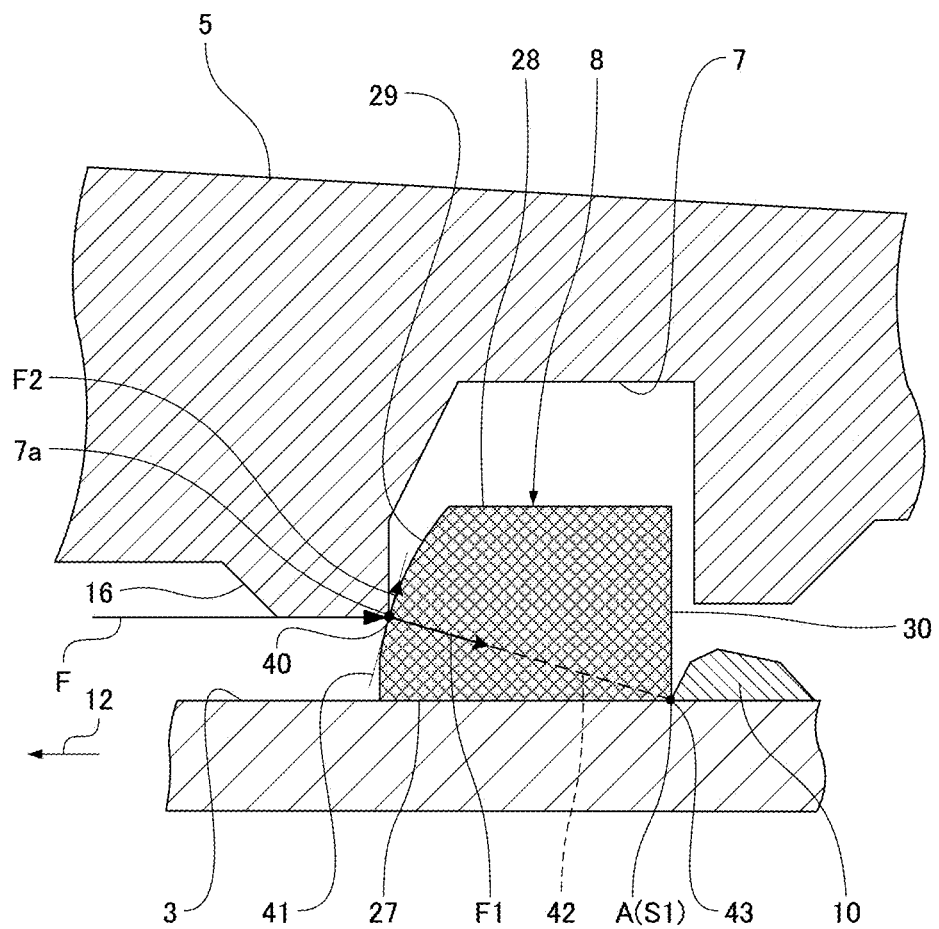
FIG. 7 illustrates a principal part of a pipe joint according to a fourth embodiment of the present invention.

In a fourth embodiment, as illustrated in FIG. 7, a spigot protrusion 10 is formed on the outer circumference of a spigot 3 by overlaying. Only at an A point at the innermost position, the spigot protrusion 10 is in contact with a second surface for preventing separation 30 of a lock ring 8. A first surface for preventing separation 29 is curved along an arc having a center S1 on a surface normal 42 of a tangential plane 41. The center S1 of the arc of the first surface for preventing separation 29 is located at the intersection point of the surface normal 42 of the tangential plane 41 at a contact point 40 and the second surface for preventing separation 30.

In this case, while passing through the second surface for preventing separation 30, the surface normal 42 of the tangential plane 41 passes through an A point at the innermost position in a radial direction of the second surface for preventing separation 30. Around the A point at the innermost position, a moment generated by a component force F1 along the surface normal 42 is not applied to the lock ring 8.

The surface normal 42 passes through the A point at the innermost position of the second surface for preventing separation 30 of the lock ring 8, so that the angle of the surface normal 42 with respect to the axis of the lock ring 8 is smaller than that in the case where the surface normal passes through the inner circumference face of the lock ring 206 as illustrated in FIG. 26. Thus, a component F12 in a radial direction of the component force F1 applied along the surface normal 42 decreases. This can suppress a pressing force that presses the lock ring 8 to the outer circumference of a spigot 3 based on a force from the contact point 40.

In the descriptions of the first to fourth embodiments, the pipe joint 1 is not bent. However, even if the pipe joint 1 is bent, the position of the contact point 40 is not changed and the line of application of the component force F1 along the surface normal 42 always passes through the second surface for preventing separation 30. Thus, even if the pipe joint 1 is bent, the same effect can be obtained as in the case where the pipe joint 1 is not bent.

Regarding the second to fourth embodiments, matters not described in the foregoing description are identical to or shared with the first embodiment.

Fifth Embodiment

In a fifth embodiment, the lock ring 8 according to the first to fourth embodiments further includes the following structure. In the following description, the same members as those of the pipe joints 1 described in the first to fourth embodiments are denoted by the same reference numerals and a detailed description thereof is omitted.

The lock ring 8 is a metallic ring having elasticity and can elastically expand and contract in a radial direction. Thus, the lock ring 8 can be increased in diameter by using an expander tool 101 illustrated in FIG. 14. Moreover, the lock ring 8 can keep a spacing 34 between end faces 32 and 33 at a dividing portion 24 by using a spacing keeping tool 123 illustrated in FIGS. 15 and 16.

Figure 8:
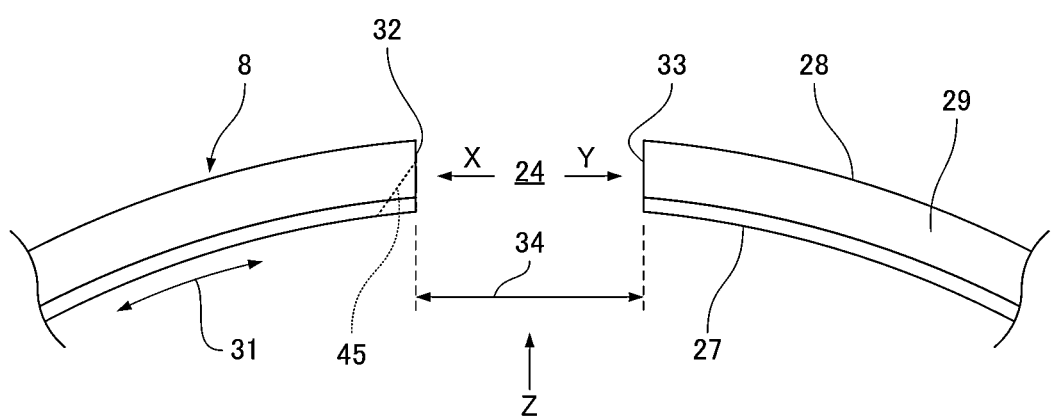
FIG. 8 is a front view illustrating a dividing portion of a lock ring provided in a pipe joint according to a fifth embodiment of the present invention.
Figure 9:
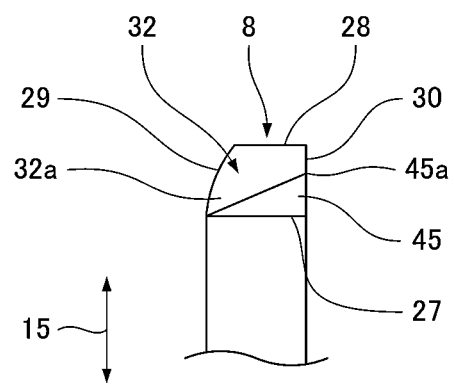
FIG. 9 is a view along X in FIG. 8.
Figure 10:
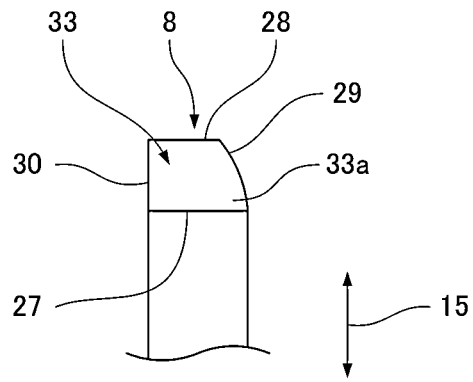
FIG. 10 is a view along Y in FIG. 8.
Figure 11:
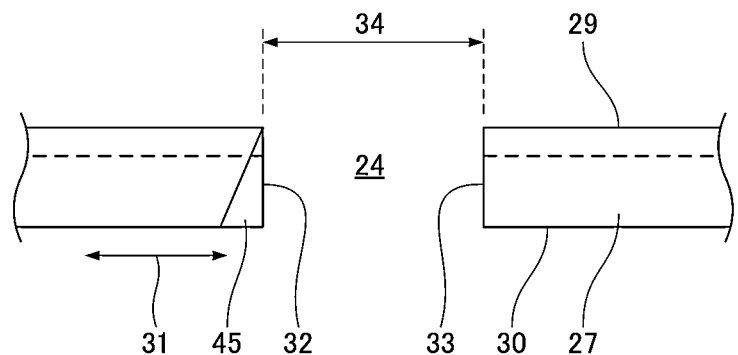
FIG. 11 is a view along Z in FIG. 8.

As illustrated in FIGS. 8 to 10, the end faces 32 and 33 at the dividing portion 24 of the lock ring 8 have engaging portions 32a and 33a where contact members 121 and 122 (see FIGS. 15 and 16) of the spacing keeping tool 123 can be engaged.

Figure 24:
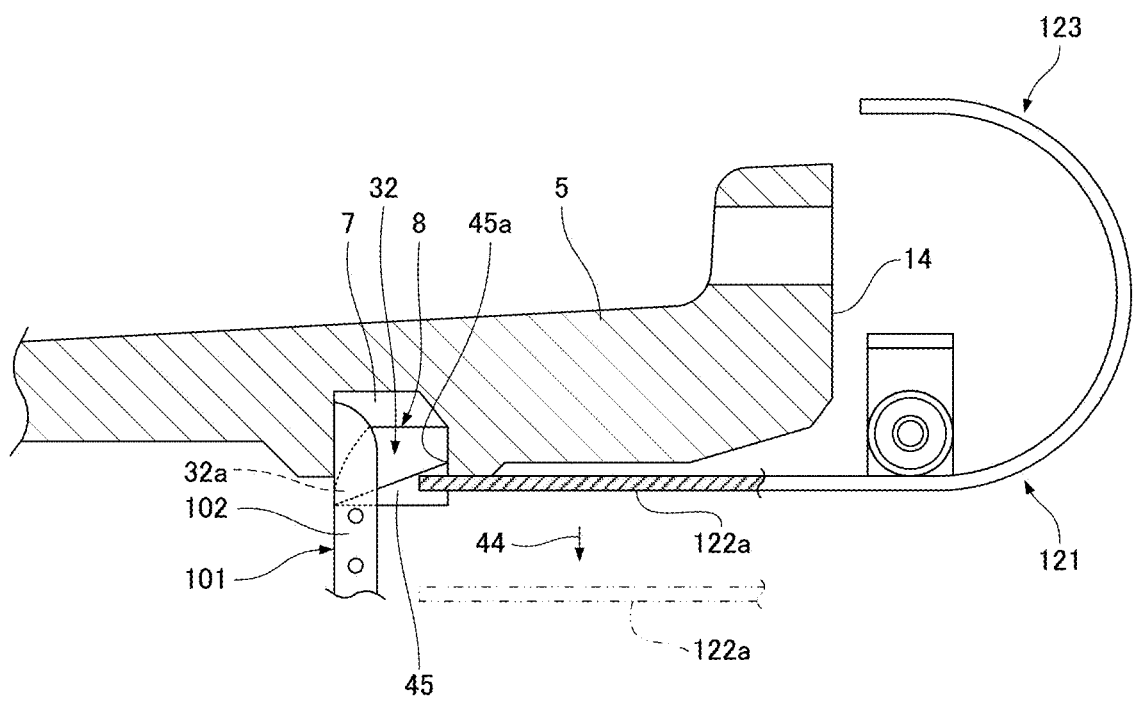
FIG. 24 is an explanatory drawing of a subsequent step of FIG. 23, illustrating a state in which the spacing keeping tool is guided to a release portion and is separated from the end face of the lock ring when the spacing keeping tool is inserted into the dividing portion of the lock ring while the lock ring is increased in diameter by using the expander tool.

The end face 32 at the dividing portion 24 of the lock ring 8 has a release portion 45 that releases the contact members 121 and 122 of the spacing keeping tool 123 in a separation direction 44 (see FIG. 24). The separation direction 44 is a direction that separates the contact members 121 and 122 inward from the end face 32 of the lock ring 8 in a radial direction of the lock ring 8.

Figure 12:
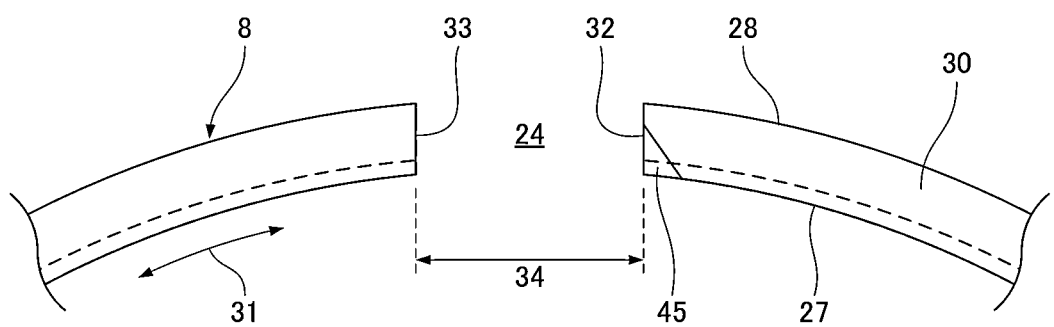
FIG. 12 is a rear view illustrating a dividing portion of the lock ring.

As illustrated in FIG. 12, the release portion 45 is an inclined face extending from the end face 32 to the inner circumference face 27 of the lock ring 8. When the lock ring 8 is viewed from the side where the second surface for preventing separation 30 is formed, the release portion 45 tilts in a direction that increases the spacing 34 between the end faces 32 and 33 toward the inside in the radial direction and tilts in a direction that increases the spacing 34 between the end faces 32 and 33 as the first surface for preventing separation 29 approaches the second surface for preventing separation 30.

As illustrated in FIG. 9, the release portion 45 decreases in size in the radial direction 15 as the second surface for preventing separation 30 approaches the first surface for preventing separation 29 and is shaped like a right triangle when viewed in the circumferential direction 31 of the lock ring 8.

Figure 17:
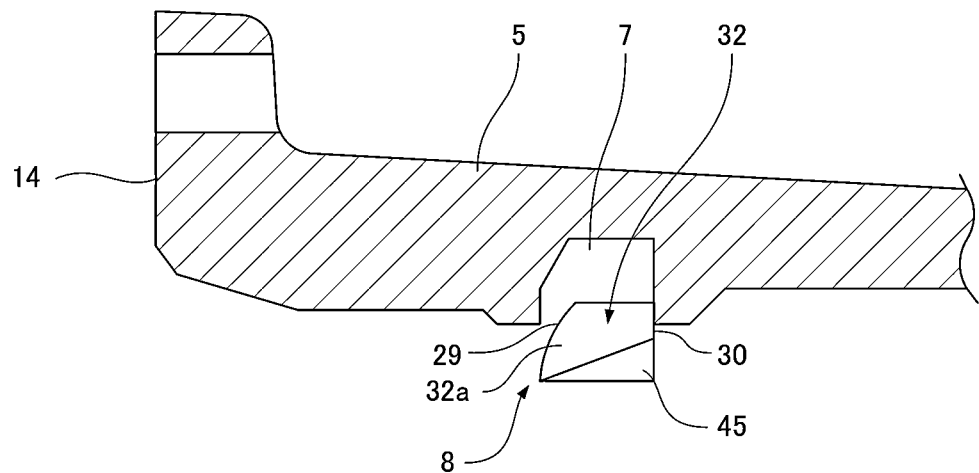
FIG. 17 is an explanatory drawing of a joining method of the pipe constituting the pipe joint, in which the lock ring in a normal orientation is set in a lock-ring storage groove.

As illustrated in FIG. 17, if the lock ring 8 is stored in a normal orientation in the lock-ring storage groove 7, the engaging portion 32a of the end face 32 is placed near the opening end face 14 of the socket 5 and the release portion 45 of the one end face 32 is placed near the deep end face 26 (see FIG. 1) of the socket 5.

Figure 22:
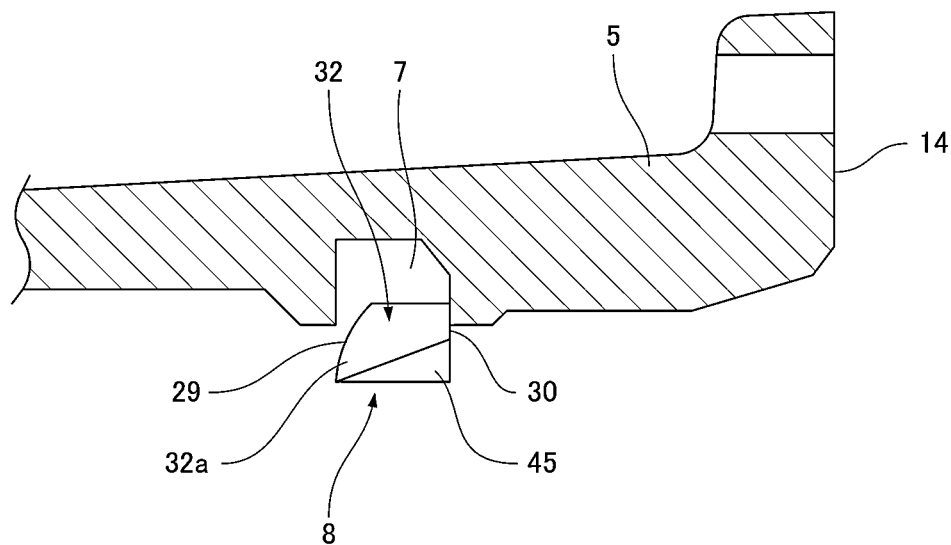
FIG. 22 is another explanatory drawing of a pipe joining method, illustrating a state in which the lock ring in an inverted orientation is set in the lock-ring storage groove.

As illustrated in FIG. 22, if the lock ring 8 is stored in an inverted orientation in the lock-ring storage groove 7, the release portion 45 of the one end face 32 is placed near the opening end face 14 of the socket 5 and the engaging portion 32a of the end face 32 is placed near the deep end face 26 of the socket 5.

Figure 13:
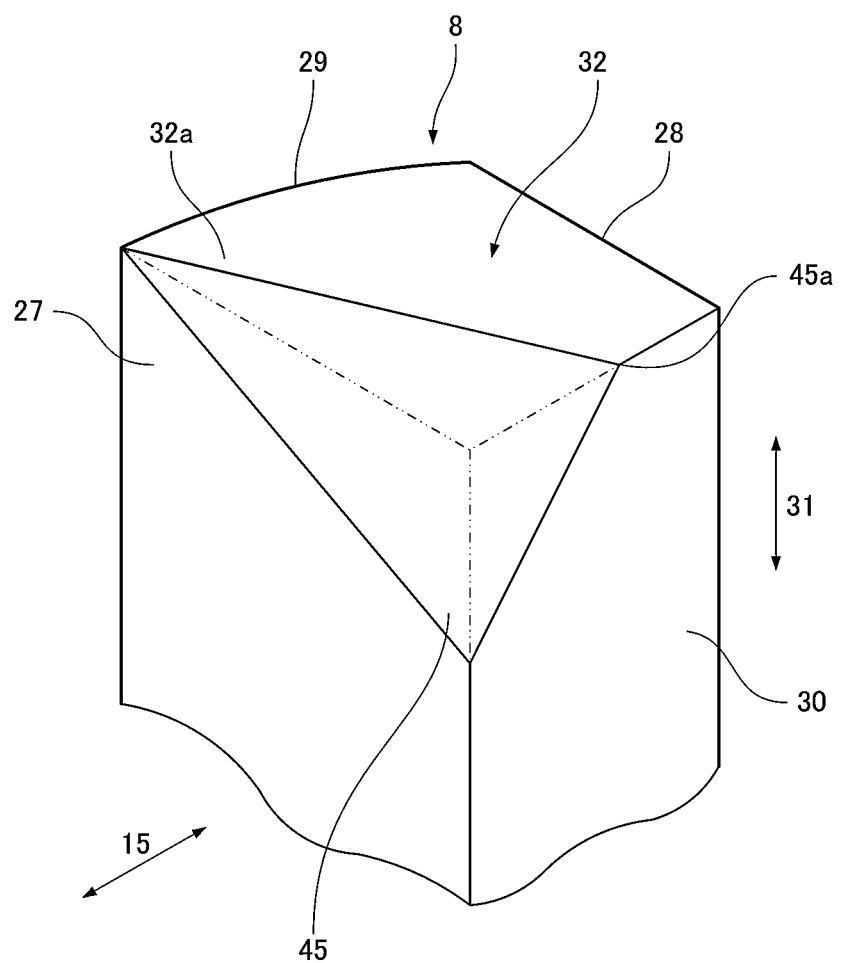
FIG. 13 is an enlarged perspective view illustrating one end face of the lock ring.
Figure 18:
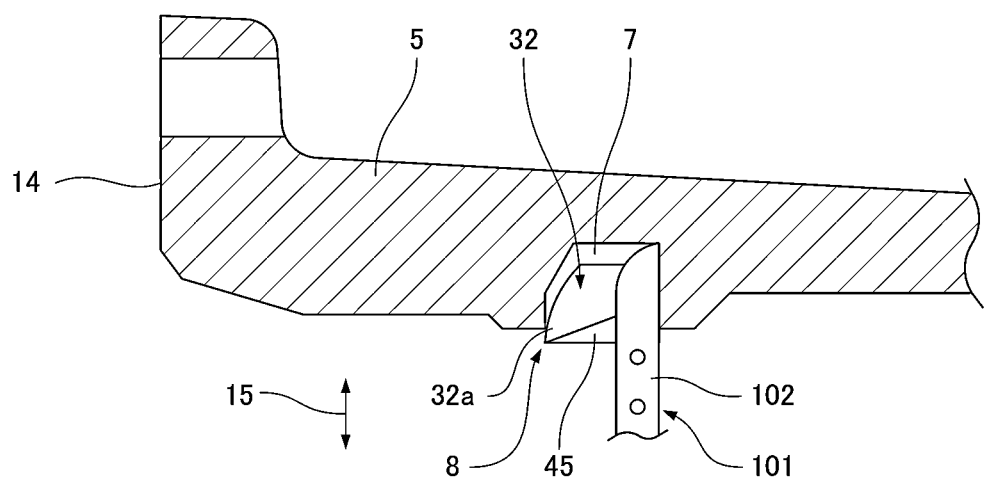
FIG. 18 is an explanatory drawing of a subsequent step of FIG. 17, illustrating a state in which the lock ring is increased in diameter by using the expander tool.
Figure 23:
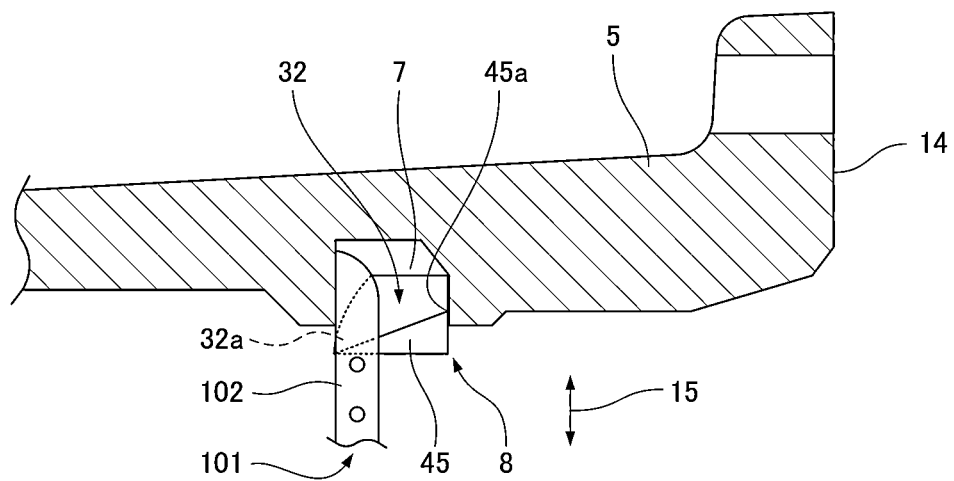
FIG. 23 is an explanatory drawing of a subsequent step of FIG. 22, illustrating a state in which the lock ring is increased in diameter by using the expander tool.

As illustrated in FIGS. 18 and 23, the engaging portions 32a and 33a and the release portion 45 are exposed inward from the lock-ring storage groove 7 in the radial direction 15 in a state in which the lock ring 8 is increased in diameter by using the expander tool 101. At this point, an outer end portion 45a (see FIGS. 9 and 13) of the release portion 45 in the radial direction 15 is placed into the lock-ring storage groove 7.

The structure of the expander tool 101 will be described below.

Figure 14:
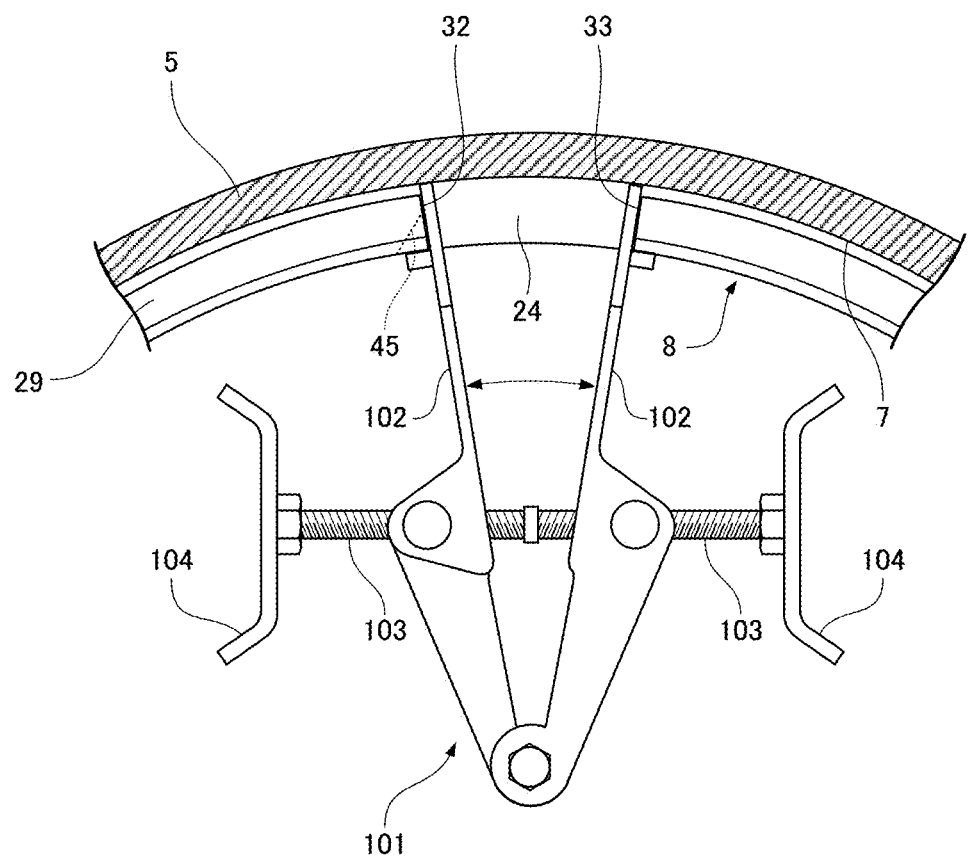
FIG. 14 illustrates an expander tool used when pipes of the pipe joint are joined to each other.

As illustrated in FIG. 14, the expander tool 101 is a forficate tool including a pair of leg portions 102 that can be opened and closed, screw rods 103 screwed into the leg portions 102, and handles 104. When the handles 104 are rotated, the leg portions 102 are opened or closed by a screw feed mechanisms of the screw rods 103 to increase or reduce a spacing between the distal end portions of the leg portions 102.

The structure of the spacing keeping tool 123 will be described below.

Figure 15:
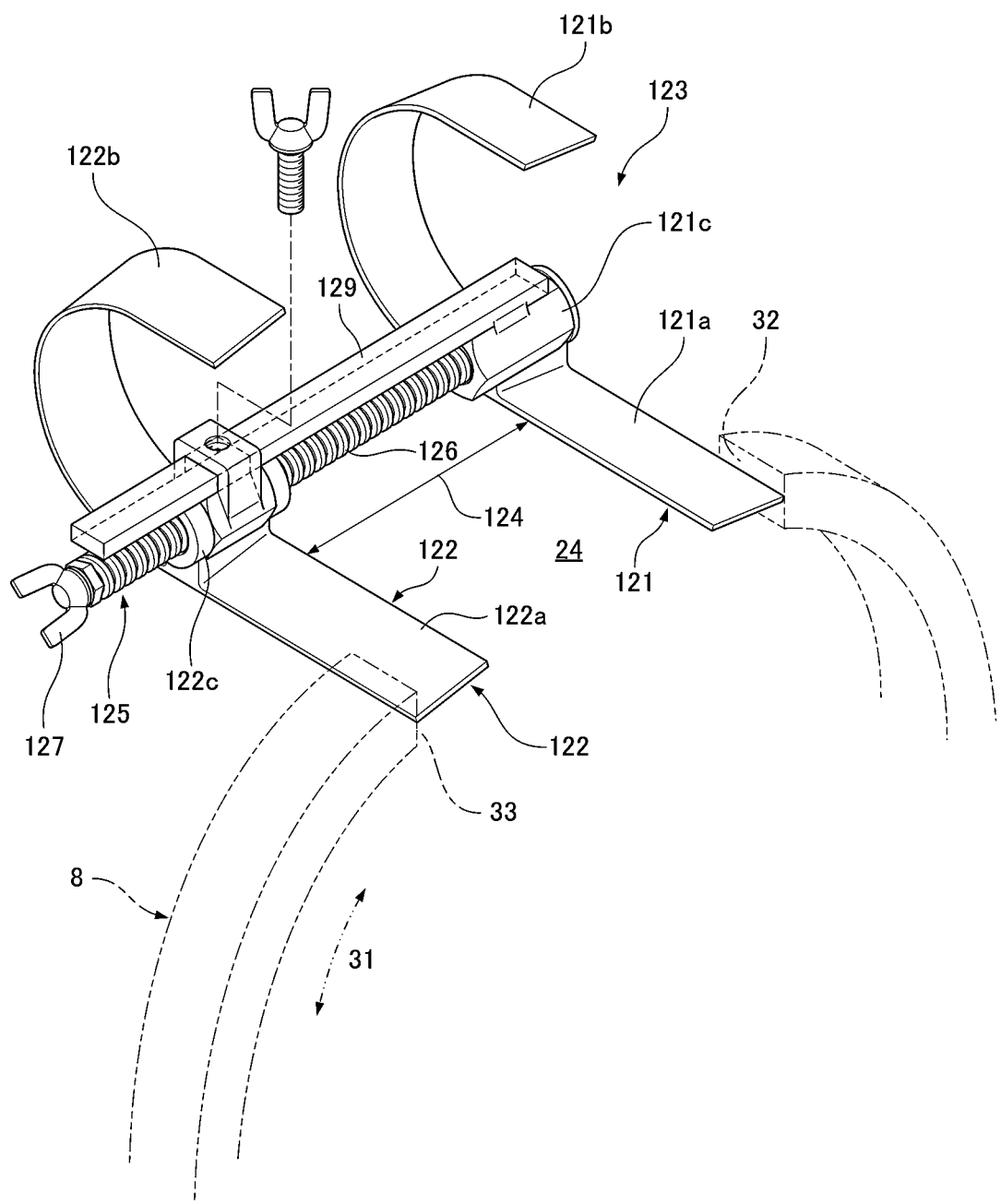
FIG. 15 illustrates a spacing keeping tool used when the pipes of the pipe joint are joined to each other.
Figure 16:
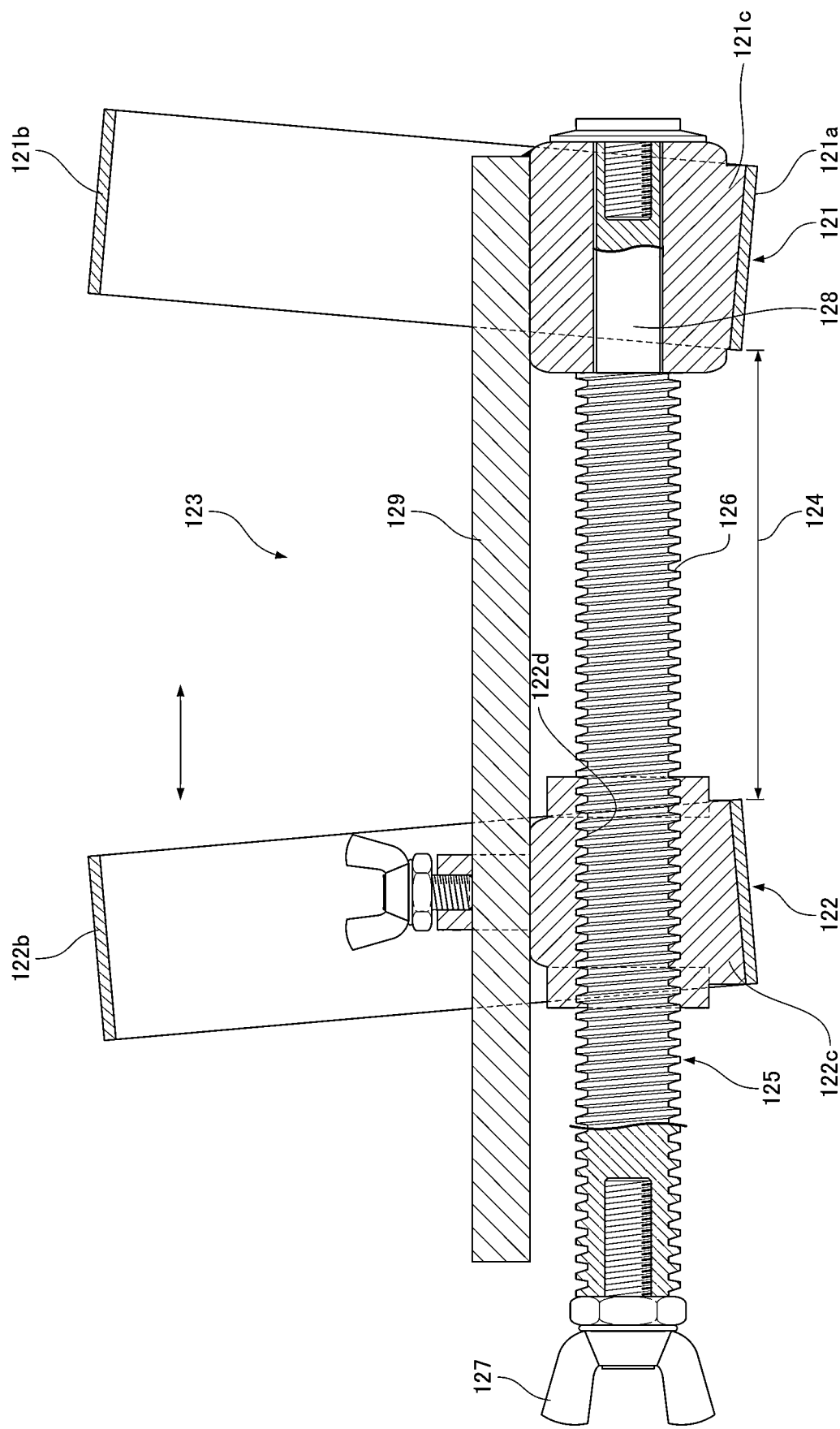
FIG. 16 is a cross-sectional view of the spacing keeping tool.

As illustrated in FIGS. 15 and 16, the spacing keeping tool 123 includes the pair of contact members 121 and 122 that can be inserted into the dividing portion 24 of the lock ring 8 and make contact with the engaging portions 32a and 33a of the end faces 32 and 33 of the lock ring 8, and a spacing regulating member 125 that connects the contact members 121 and 122 and can regulate a spacing 124 between the contact members 121 and 122 along the circumferential direction 31 of the lock ring 8.

The spacing regulating member 125 includes a screw portion 126 provided from the first contact member 121 and the second contact member 122, a wing bolt 127 that is attached to one end of the screw portion 126 to rotate the screw portion 126, and a shaft portion 128 attached to the other end of the screw portion 126.

The shaft portion 128 is a member like a straight round bar that has a smaller diameter than a recessed portion of the screw portion 126 and has no external threads on the outer circumference.

The first contact member 121 has a plate-like insertion portion 121a formed with a length to the outside of the socket 5, a handgrip portion 121b, and a supporter 121c in which the shaft portion 128 of the screw portion 126 is inserted.

The screw portion 126 idles with respect to the supporter 121c, and the supporter 121c is prevented from moving relative to the axial direction of the screw portion 126.

The second contact member 122 has a plate-like insertion portion 122a formed with a length to the outside of the socket 5, a handgrip portion 122b, and a feed nut 122c that has an internal thread 122d on the inner surface so as to be engaged with the screw portion 126. The screw portion 126 is screwed into the feed nut 122c.

On the outer surface of the supporter 121c of the first contact member 121, a rod-like rotation preventing member 129 is attached to prevent relative rotations of the first contact member 121 and the second contact member 122. The rotation preventing member 129 extends from the supporter 121c of the first contact member 121 to the feed nut portion 122c of the second contact member 122.

When the screw portion 126 is rotated, the second contact member 122 is brought close to or separated from the first contact member 121 in the axial direction of the screw portion 126 by the screw feed mechanism. Through the operations of approach and separation, the spacing 124 between the first contact member 121 and the second contact member 122 can be regulated.

A method for joining the pipes 2 and 4 in the pipe joint 1 will be described below.

The backup ring 23, the seal member 17, and the gland 18 are fit onto the spigot 3 in advance. In the fit state, the lock ring 8 is set into the lock-ring storage groove 7 as illustrated in FIG. 17. At this point, if the lock ring 8 is set in a normal orientation in the lock-ring storage groove 7 in the pipe axial direction, the engaging portion 32a of the one end face 32 is placed near the opening end face 14 of the socket 5 and the release portion 45 is placed near the deep end face 26 (see FIG. 1) of the socket 5.

In the positioned state, the diameter of the lock ring 8 is increased by the expander tool 101 as illustrated in FIG. 18. At this point, as illustrated in FIG. 14, the distal ends of the leg portions 102 of the expander tool 101 are inserted into the dividing portion 24 of the lock ring 8. Through the insertion, the distal end of one of the leg portions 102 is inserted into the lock-ring storage groove 7 and is engaged with the end face 32 of the lock ring 8 and the distal end of the other leg portion 102 is inserted into the lock-ring storage groove 7 and is engaged with the other end face 33 of the lock ring 8.

At this point, as illustrated in FIG. 18, the distal ends of the leg portions 102 of the expander tool 101 are shifted close to the deep end face 26 of the socket 5 in the lock-ring storage groove 7.

Thereafter, the handles 104 are rotated to open the leg portions 102. Thus, the spacing 34 between the end faces 32 and 33 of the lock ring 8 is extended to increase the diameter of the lock ring 8.

In this state, as illustrated in FIG. 15, the insertion portions 121a and 122a of the spacing keeping tool 123 are inserted into the dividing portion 24 of the lock ring 8 from the opening end of the socket 5. Furthermore, the wing bolt 127 is rotated to extend the spacing 124 between the first contact member 121 and the second contact member 122.

Figure 19:
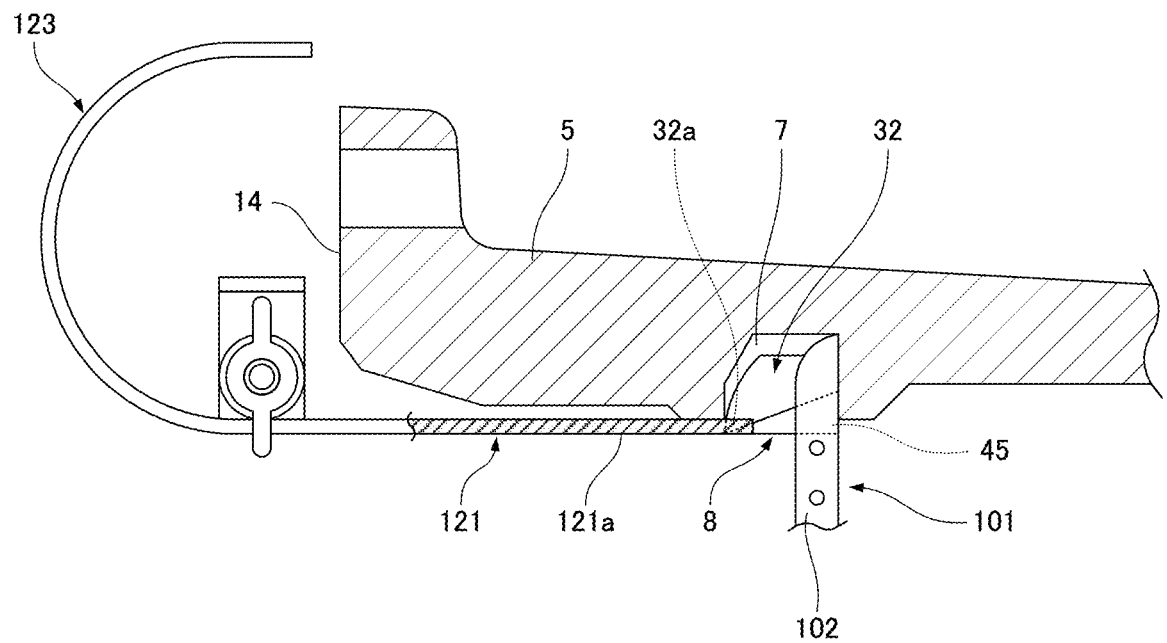
FIG. 19 is an explanatory drawing of a subsequent step of FIG. 18, illustrating a state in which the spacing keeping tool is inserted into the dividing portion of the lock ring while the lock ring is increased in diameter by using the expander tool.

Thus, as illustrated in FIG. 19, the insertion portion 121a of the first contact member 121 of the spacing keeping tool 123 is engaged with the engaging portion 32a of the end face 32 of the lock ring 8. At this point, the insertion portion 122a of the second contact member 122 is engaged with the engaging portion 33a of the other one end face 33 of the lock ring 8.

Figure 20:
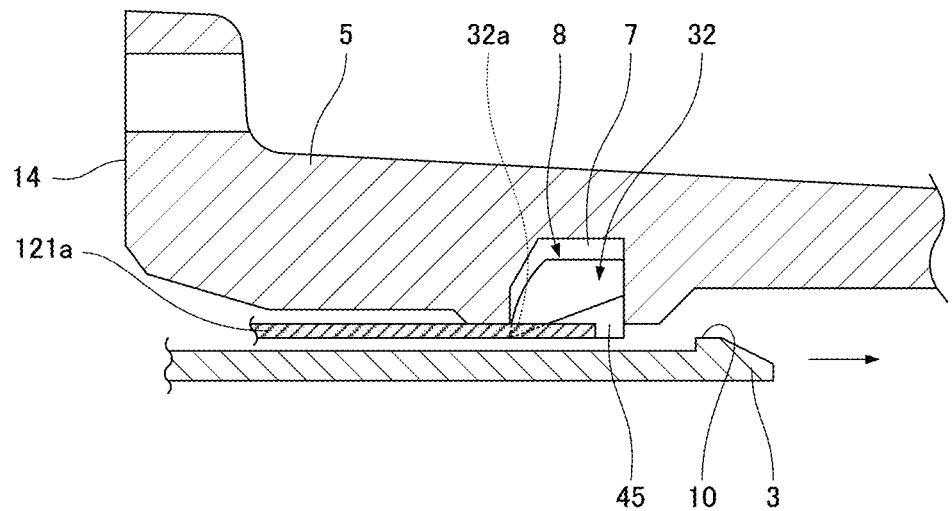
FIG. 20 is an explanatory drawing of a subsequent step of FIG. 19, illustrating a state in which the expander tool is removed from the lock ring and the spacing between the end faces of the lock ring increased in diameter is kept by the spacing keeping tool.

Thereafter, as illustrated in FIG. 20, the expander tool 101 is removed from the lock ring 8. As a result, the spacing 34 between the end faces 32 and 33 of the lock ring 8 increased in diameter is kept by the spacing keeping tool 123. Thus, even if the expander tool 101 is removed from the lock ring 8, the lock ring 8 is continuously kept with an increased diameter.

In this state, the spigot 3 is inserted into the socket 5. When the spigot protrusion 10 of the spigot 3 passes through the inner circumference of the lock ring 8 from the opening end to the deeper portion of the socket 5, the spacing keeping tool 123 is removed from the lock ring 8.

Figure 21:
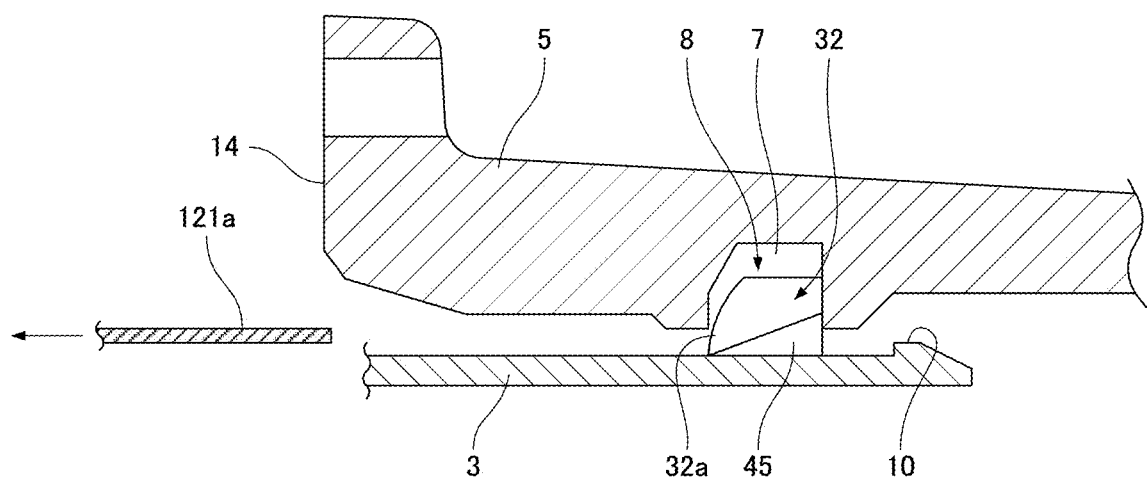
FIG. 21 is an explanatory drawing of a subsequent step of FIG. 20, illustrating a state in which the spacing keeping tool is removed from the lock ring and the lock ring is reduced in diameter.

Thus, as illustrated in FIG. 21, the insertion portions 121a and 122a of the spacing keeping tool 123 are separated from the engaging portions 32a and 33a of the lock ring 8. Through the separation, the spacing 34 between the end faces 32 and 33 of the lock ring 8 is reduced, so that the lock ring 8 is reduced in diameter to be wrapped around the outer circumference of the spigot 3.

Thereafter, as illustrated in FIG. 1, the backup ring 23 is moved in the pipe axial direction and is inserted between the inner circumference of the socket protrusion 16 and the outer circumference of the spigot 3.

In this state, the seal member 17 is moved in the pipe axial direction and is inserted between the inner circumference of the socket 5 and the outer circumference of the spigot 3. Thus, the gland 18 is coupled to the flange portion 21 of socket 5 with the plurality of sets of T bolts 19 and nuts 20 and is brought into contact with the opening end face 14. Hence, the pipes 2 and 4 are joined to each other.

In the following description, when the lock ring 8 is set in the lock-ring storage groove 7, the lock ring 8 in an inverted orientation is set by mistake in the lock-ring storage groove 7 in the pipe axial direction as illustrated in FIG. 22. In this case, the engaging portion 32a of the end face 32 is placed near the deep end face 26 of the socket 5, and the release portion 45 of the one end face 32 is placed near the opening end face 14 of the socket 5.

Also in this case, as illustrated in FIG. 23, the distal ends of the leg portions 102 of the expander tool 101 are inserted into the dividing portion 24 of the lock ring 8. Through the insertion, the distal end of one of the leg portions 102 is inserted into the lock-ring storage groove 7 and is engaged with the end face 32 of the lock ring 8 and the distal end of the other leg portion 102 is inserted into the lock-ring storage groove 7 and is engaged with the other end face 33 of the lock ring 8.

At this point, the distal ends of the leg portions 102 are shifted close to the deep end face 26 of the socket 5 in advance in the lock-ring storage groove 7.

Thereafter, the leg portions 102 are opened by rotating the handles 104. Thus, the spacing 34 between the end faces 32 and 33 of the lock ring 8 is extended to increase the diameter of the lock ring 8.

In this state, as illustrated in FIG. 24, the insertion portions 121a and 122a of the spacing keeping tool 123 are inserted into the dividing portion 24 of the lock ring 8 from the opening end of the socket 5. In this state, the wing bolt 127 is rotated to extend the spacing 124 between the first contact member 121 and the second contact member 122.

Thus, the insertion portions 121a and 122a of the spacing keeping tool 123 are engaged with the engaging portions 32a and 33a of the lock ring 8 as follows: the release portion 45 of the end face 32 is placed near the opening end face 14 of the socket 5, so that the insertion portion 122a of the second contact member 122 is guided to the tilted release portion 45 and slides along the release portion 45 in the separation direction 44 without being engaged with the engaging portion 32a of the one end face 32. Through the sliding, as indicated by virtual lines in FIG. 24, the insertion portion 122a is separated inward from the one end face 32 in the radial direction 15 of the lock ring 8.

Thus, the spacing keeping tool 123 cannot keep the spacing 34 between the end faces 32 and 33 of the lock ring 8, which has been increased in diameter by the expander tool 101. Therefore, an operator can notice an inverted orientation of the mounted lock ring 8 in the pipe axial direction before inserting the spigot 3 into the socket 5 to insert the pipe. This can shorten a time for a rejoining operation of the first pipe 2 and the second pipe 4.

The rejoining operation of the first pipe 2 and the second pipe 4 will be described below. In this case, first, the diameter of the lock ring 8 is reduced by removing the expander tool 101 from the lock ring 8. The lock ring 8 reduced in diameter is removed from the lock-ring storage groove 7. As illustrated in FIG. 17, the removed lock ring is corrected to a normal orientation and then is set into the lock-ring storage groove 7 again.

Thereafter, as illustrated in FIGS. 18 to 21, the lock ring 8 is similarly increased in diameter by the expander tool 101, and the lock ring 8 is kept with the extended diameter by the spacing keeping tool 123.

As illustrated in FIGS. 1 to 7, in the first to fourth embodiments, the lock ring 8 does not include the release portion 45 (see FIG. 9) in the fifth embodiment. However, in the first to fourth embodiments, the lock ring 8 including the release portion 45 may be used as in the fifth embodiment. In this case, the pipes 2 and 4 are joined in the same steps as in the fifth embodiment.

Sixth Embodiment

In the fifth embodiment, the release portion 45 is an inclined face as illustrated in FIG. 12. However, the release portion 45 is not limited to an inclined face. For example, as a sixth embodiment, a release portion 45 may be a curved surface extending like an arc from an end face 32 to an inner circumference face 27 of a lock ring 8 as illustrated in FIG. 25. The curved surface is formed in a direction along which a spacing 34 between the end face 32 and an end face 33 increases toward the inside in a radial direction.

If the lock ring 8 in FIG. 25 is set in an inverted orientation by mistake in a lock-ring storage groove 7, the method for joining the pipes 2 and 4 is configured as follows: while the diameter of the lock ring 8 is increased by an expander tool 101, an insertion portion 121a of a first contact member 121 of a spacing keeping tool 123 is not engaged with one engaging portion 32a. The insertion portion 121a is then guided to the curved release portion 45, slides along the release portion 45 in a separation direction 44 indicated in FIG. 24, and is separated inward from the one end face 32 of the lock ring 8 in a radial direction 15 of the lock ring 8.

In the fifth and sixth embodiments, as illustrated in FIGS. 12 and 25, the release portion 45 is formed on the either one end face 32 of the lock ring 8. However, the release portion 45 may be formed on each of the end faces 32 and 33.

As illustrated in FIGS. 1 to 7, the lock ring 8 according to the first to fourth embodiments does not include the release portion 45 (see FIG. 25) described in the sixth embodiment. However, in the first to fourth embodiments, the lock ring 8 including the release portion 45 may be used as in the sixth embodiment.

According to the descriptions of the embodiments, techniques are disclosed as follows:

(Technique 1)

A pipe joint in which
- a spigot of a first pipe is inserted into a socket of a second pipe,
- a lock-ring storage groove is formed on an inner circumference of the socket,
- a lock ring stored in the lock-ring storage groove is attached to an outer circumference of the spigot,
- a spigot protrusion is formed on the outer circumference of the spigot, and
- the spigot protrusion is engaged with the lock ring from a deeper portion of the socket in a separation direction of the spigot so as to prevent the spigot from separating from the socket, wherein the lock ring has a first surface for preventing separation facing an opening end of the socket and a second surface for preventing separation facing the deeper portion of the socket, and in a state in which the spigot protrusion is engaged with the lock ring and the first surface for preventing separation of the lock ring is in contact with an opening edge of the lock-ring storage groove around a pipe axial direction, a surface normal of a tangential plane at a contact point between the opening edge of the lock-ring storage groove and the first surface for preventing separation of the lock ring passes through the second surface for preventing separation of the lock ring.

When a drawing force is applied to the pipes in the pipe joint, the spigot protrusion is engaged with the lock ring and the first surface for preventing separation of the lock ring is brought into contact with the opening edge of the lock-ring storage groove. At this point, a force in the pipe axial direction is applied to a contact point between the first surface for preventing separation of the lock ring and the opening edge of the lock-ring storage groove. The force applied to the contact point in the pipe axial direction is applied to the lock ring as a component force along the surface normal of the tangential plane at the contact point and a component force along the tangential plane.

The surface normal of the tangential plane passes through the second surface for preventing separation, so that a line of application of the component force along the surface normal of the tangential plane passes through the second retaining surface.

The component force applied along the surface normal of the tangential plane has a component of force applied in the axial direction of the lock ring and a component of force applied in a radial direction of the lock ring. The component in the axial direction of the lock ring increases and the component in the radial direction of the lock ring decreases as an angle of the surface normal decreases with respect to the axis of the lock ring. Thus, the surface normal of the tangential plane passes through the second surface for preventing separation of the lock ring, so that the component in the radial direction of the lock ring is small in the component force along the surface normal of the tangent surface as compared with a case where the surface normal of the tangential plane passes through the inner circumference face of the lock ring. This can suppress an applied force that presses the lock ring onto the outer circumference of the spigot based on a drawing force.

(Technique 2)

The pipe joint according to technique 1, wherein the inner edge of the lock ring is included in the second surface for preventing separation, and the surface normal of the tangential plane passes through the inner edge of the lock ring while passing through the second surface for preventing separation.

(Technique 3)

The pipe joint according to technique 1, wherein the inner edge of the lock ring is included in the second surface for preventing separation, and the surface normal of the tangential plane passes through the second surface for preventing separation between the inner edge of the lock ring and a position where the outer edge of the spigot protrusion is in contact with the second surface for preventing separation.

(Technique 4)

The pipe joint according to any one of techniques 1 to 3, wherein the first surface for preventing separation of the lock ring is shaped like a circular conical surface.

(Technique 5)

The pipe joint according to any one of techniques 1 to 3, wherein the first surface for preventing separation of the lock ring is curved along an arc having a center on the surface normal of the tangential plane.

(Technique 6)

The pipe joint according to technique 5, wherein the center of the arc of the first surface for preventing separation is located at an intersection point of the surface normal of the tangential plane and the second surface for preventing separation.

(Technique 7)

The pipe joint according to any one of techniques 1 to 6, wherein the lock ring is a ring having a single-cut structure with a dividing portion at a point along the circumferential direction, end faces at the dividing portion of the lock ring in the circumferential direction have engaging portions that allow engagement of a spacing keeping tool, the spacing keeping tool keeping a spacing between the end faces of the lock ring increased in diameter, at least one of the end faces of the lock ring has a release portion for releasing the spacing keeping tool in a separation direction that separates the spacing keeping tool inward from the end face of the lock ring in a radial direction of the lock ring, if the lock ring is stored in a normal orientation in the lock ring storage groove, the engaging portion is placed near the opening end of the socket and the release portion is placed near the deep end of the socket, and the engaging portions and the release portion are exposed inward from the lock-ring storage groove in the radial direction in a state in which the lock ring is increased in diameter.

With this configuration, when the first pipe and the second pipe are joined, the lock ring is first set in the lock-ring storage groove. At this point, if the lock ring is stored in a normal orientation in the lock-ring storage groove in the pipe axial direction, the engaging portion is placed near the opening end of the socket and the release portion is placed near the deep end of the socket.

Thereafter, in a state in which the lock ring is increased in diameter by an expander tool, the spacing keeping tool is inserted from the opening end of the socket into the dividing portion of the lock ring and is engaged with the engaging portions. At this point, the engaging portions are placed closer to the opening end of the socket than the release portion, so that the spacing keeping tool is engaged with the engaging portion. Thus, the spacing keeping tool can keep the spacing between the end faces of the lock ring increased in diameter.

In this state, the spigot is inserted into the socket. At this point, the spigot protrusion passes through the inner circumference of the lock ring from the opening end to the deep end of the socket, and then the spacing keeping tool is removed from the lock ring. The removal reduces the diameter of the lock ring.

When the first pipe and the second pipe are joined, the lock ring in an inverted orientation may be set by mistake in the lock-ring storage groove in the pipe axial direction. At this point, the release portion is placed near the opening end of the socket, and the engaging portion is placed near the deep end of the socket.

In such positioning with the lock ring increased in diameter by the expander tool, the spacing keeping tool is inserted from the opening end of the socket into the dividing portion of the lock ring and is engaged with the engaging portions. At this point, the release portion is placed closer to the opening end of the socket than the engaging portions, so that the spacing keeping tool is guided to the release portion and is separated inward from the end face of the lock ring in the radial direction of the lock ring without being engaged with the engaging portions.

As described above, if the lock ring is set in an inverted orientation by mistake in the lock-ring storage groove, the spacing keeping tool to be engaged with the engaging portions of the lock ring is guided to the release portion and is separated from the end face of the lock ring without being engaged with the engaging portions. Thus, the spacing keeping tool cannot keep the spacing between the end faces of the lock ring increased in diameter.

With this configuration, an operator can find an error in the attachment of the lock ring before a pipe inserting operation is performed to insert the spigot into the socket. This can shorten a time for a rejoining operation of the pipes. (Technique 8)

The pipe joint according to technique 7, wherein the release portion is an inclined face extending from the end face of the lock ring to the inner circumference face of the lock ring, and the inclined face tilts in a direction that increases the spacing between the end faces of the lock ring toward the inside in a radial direction.

In the pipe joint, if the lock ring is set in an inverted orientation by mistake in the lock-ring storage groove, the spacing keeping tool is guided inward in the radial direction of the lock ring by the inclined face of the release portion and is separated from the end face of the lock ring while the lock ring is increased in diameter by using the expander tool. (Technique 9)

The pipe joint according to technique 7, wherein the release portion is a curved surface extending like an arc from the end face of the lock ring to the inner circumference face of the lock ring, and the curved surface is curved in a direction that increases the spacing between the end faces of the lock ring toward the inside in a radial direction.

In the pipe joint, if the lock ring is set in an inverted orientation by mistake in the lock-ring storage groove, the spacing keeping tool is guided inward in the radial direction of the lock ring by the curved surface of the release portion and is separated from the end face of the lock ring while the lock ring is increased in diameter by using the expander tool. (Technique 10)

A pipe joining method for assembling the pipe joint according to any one of techniques 7 to 9, the method including:
  setting the lock ring into the lock-ring storage groove in the socket;
  inserting the spacing keeping tool from the opening end of the socket into the dividing portion of the lock ring and engaging the spacing keeping tool with the engaging portions of the end faces while the lock ring is increased in diameter by using the expander tool;
  removing the expander tool from the lock ring and keeping, by using the spacing keeping tool, the spacing between the end faces of the lock ring increased in diameter; and
  removing the spacing keeping tool from the lock ring and reducing the diameter of the lock ring when the spigot protrusion is caused to pass through the inner circumference of the lock ring from the opening end to the deeper portion of the socket by inserting the spigot into the socket.

According to the joining method, if the lock ring is set in a normal orientation in the lock-ring storage groove in the pipe axial direction, the engaging portion is placed near the opening end of the socket and the release portion is placed near the deep end of the socket. Thus, the spacing keeping tool can be engaged with the engaging portions of the lock ring, so that the spacing keeping tool can keep the spacing between the end faces of the lock ring increased in diameter. (Technique 11)

A pipe joining method for assembling the pipe joint according to any one of techniques 7 to 9, the method including:
  setting the lock ring into the lock-ring storage groove in the socket;
  determining that the lock ring is attached in an inverted orientation in the pipe axial direction if the spacing keeping tool is guided to the release portion and is separated from the end face of the lock ring without being engaged with the engaging portions when the spacing keeping tool is inserted from the opening end of the socket into the dividing portion of the lock ring and is to be engaged with the engaging portions of the end faces while the lock ring is increased in diameter by using the expander tool;
  removing the expander tool from the lock ring to reduce the diameter of the lock ring;
  removing the lock ring from the lock-ring storage groove;
  correcting the lock ring to a normal orientation and setting the lock ring into the lock-ring storage groove again;
  inserting the spacing keeping tool from the opening end of the socket into the dividing portion of the lock ring and engaging the spacing keeping tool with the engaging portions of the end faces while the lock ring is increased in diameter by using the expander tool;
  removing the expander tool from the lock ring and keeping, by using the spacing keeping tool, the spacing between the end faces of the lock ring increased in diameter; and
  removing the spacing keeping tool from the lock ring and reducing the diameter of the lock ring when the spigot protrusion is caused to pass through the inner circumference of the lock ring from the opening end to the deeper portion of the socket by inserting the spigot into the socket.

According to the joining method, if the lock ring is set in an inverted orientation by mistake in the lock-ring storage groove in the pipe axial direction, the release portion is placed near the opening end of the socket and the engaging portion is placed near the deep end of the socket. Thus, the spacing keeping tool is guided to the release portion and is separated inward from the end face of the lock ring in the radial direction of the lock ring without being engaged with the engaging portions.

The separation does not allow the spacing keeping tool to keep the spacing between the end faces of the lock ring increased in diameter. Therefore, an operator can find an error in the attachment of the lock ring before a pipe inserting operation is performed to insert the spigot into the socket. This can shorten a time for a rejoining operation of the pipes.

What is claimed is:
1. A pipe joint, comprising:
  a spigot of a first pipe;
  a socket of a second pipe into which the spigot of the first pipe is inserted;
  a lock-ring storage groove formed on an inner circumference of the socket;

a lock ring stored in the lock-ring storage groove, the lock ring being attached to an outer circumference of the spigot; and a spigot protrusion formed on the outer circumference of the spigot, and, wherein the spigot protrusion is engaged with the lock ring from a deeper portion of the socket in a separation direction of the spigot so as to prevent the spigot from separating from the socket, wherein the lock ring has a first surface for preventing separation facing an opening end of the socket and a second surface for preventing separation facing the deeper portion of the socket, and wherein, in a state in which the spigot protrusion is engaged with the lock ring and the first surface for preventing separation of the lock ring is in contact with an opening edge of the lock-ring storage groove around a pipe axial direction, a surface normal of a tangential plane at a contact point between the opening edge of the lock-ring storage groove and the first surface for preventing separation of the lock ring passes through the second surface for preventing separation of the lock ring.

2. The pipe joint according to claim 1, wherein an inner edge of the lock ring is included in the second surface for preventing separation, and wherein the surface normal of the tangential plane passes through the inner edge of the lock ring while passing through the second surface for preventing separation.

3. The pipe joint according to claim 1, wherein an inner edge of the lock ring is included in the second surface for preventing separation, and wherein the surface normal of the tangential plane passes through the second surface for preventing separation between the inner edge of the lock ring and a position where an outer edge of the spigot protrusion is in contact with the second surface for preventing separation.

4. The pipe joint according to claim 1, wherein the first surface for preventing separation of the lock ring is shaped like a circular conical surface.

5. The pipe joint according to claim 1, wherein the first surface for preventing separation of the lock ring is curved along an arc having a center on the surface normal of the tangential plane.

6. The pipe joint according to claim 5, wherein the center of the arc of the first surface for preventing separation is located at an intersection point of the surface normal of the tangential plane and the second surface for preventing separation.

7. The pipe joint according to claim 1, wherein the lock ring is a ring having a single-cut structure with a dividing portion at a point along a circumferential direction, wherein end faces at the dividing portion of the lock ring in the circumferential direction have engaging portions that allow engagement of a spacing keeping tool, the spacing keeping tool keeping a spacing between the end faces of the lock ring increased in diameter, wherein at least one of the end faces of the lock ring has a release portion for releasing the spacing keeping tool in a separation direction that separates the spacing keeping tool inward from the end face of the lock ring in a radial direction of the lock ring, wherein, if the lock ring is stored in a normal orientation in the lock ring storage groove, the engaging portion is placed near the opening end of the socket and the release portion is placed near a deep end of the socket, and wherein the engaging portions and the release portion are exposed inward from the lock-ring storage groove in the radial direction in a state in which the lock ring is increased in diameter.

8. The pipe joint according to claim 7, wherein the release portion is an inclined face extending from the end face of the lock ring to an inner circumference face of the lock ring, and the inclined face tilts in a direction that increases the spacing between the end faces of the lock ring toward inside in the radial direction.

9. The pipe joint according to claim 7, wherein the release portion is a curved surface extending like an arc from the end face of the lock ring to an inner circumference face of the lock ring, and the curved surface is curved in a direction that increases the spacing between the end faces of the lock ring toward inside in the radial direction.

10. A pipe joining method for assembling the pipe joint according to claim 7, the method comprising:

setting the lock ring into the lock-ring storage groove in the socket;

inserting the spacing keeping tool from the opening end of the socket into the dividing portion of the lock ring and engaging the spacing keeping tool with the engaging portions of the end faces while the lock ring is increased in diameter by using the expander tool;

removing the expander tool from the lock ring and keeping, by using the spacing keeping tool, the spacing between the end faces of the lock ring increased in diameter; and removing the spacing keeping tool from the lock ring and reducing the diameter of the lock ring when the spigot protrusion is caused to pass through an inner circumference of the lock ring from the opening end to the deeper portion of the socket by inserting the spigot into the socket.

11. A pipe joining method for assembling the pipe joint according to claim 7, the method comprising:

setting the lock ring into the lock-ring storage groove in the socket;

determining that the lock ring is attached in an inverted orientation in the pipe axial direction if the spacing keeping tool is guided to the release portion and is separated from the end face of the lock ring without being engaged with the engaging portions when the spacing keeping tool is inserted from the opening end of the socket into the dividing portion of the lock ring and is to be engaged with the engaging portions of the end faces while the lock ring is increased in diameter by using the expander tool;

removing the expander tool from the lock ring to reduce a diameter of the lock ring;

removing the lock ring from the lock-ring storage groove;

correcting the lock ring to a normal orientation and setting the lock ring into the lock-ring storage groove again;

inserting the spacing keeping tool from the opening end of the socket into the dividing portion of the lock ring and engaging the spacing keeping tool with the engaging portions of the end faces while the lock ring is increased in diameter by using the expander tool;

removing the expander tool from the lock ring and keeping, by using the spacing keeping tool, the spacing between the end faces of the lock ring increased in diameter; and removing the spacing keeping tool from the lock ring and reducing the diameter of the lock ring when the spigot protrusion is caused to pass through an inner circumference of the lock ring from the opening end to the deeper portion of the socket by inserting the spigot into the socket.

* * * * *